United States Patent
Takayama et al.

(10) Patent No.: US 7,908,604 B2
(45) Date of Patent: Mar. 15, 2011

(54) SYNCHRONIZATION METHOD AND PROGRAM FOR A PARALLEL COMPUTER

(75) Inventors: Koichi Takayama, Kodiara (JP); Hidetaka Aoki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1391 days.

(21) Appl. No.: 11/312,345

(22) Filed: Dec. 21, 2005

(65) Prior Publication Data
US 2006/0212868 A1 Sep. 21, 2006

(30) Foreign Application Priority Data

Mar. 15, 2005 (JP) ................................. 2005-072633

(51) Int. Cl.
*G06F 9/46* (2006.01)
(52) U.S. Cl. ........................................................ 718/101
(58) Field of Classification Search .................... 718/101
See application file for complete search history.

(56) References Cited

U.S. PATENT DOCUMENTS 7,512,950 B1 * 3/2009 Marejka ........................ 718/106
2004/0263519 A1 * 12/2004 Andrews et al. .............. 345/502

FOREIGN PATENT DOCUMENTS
JP 05-151174 6/1993
JP 11-312148 11/1999

OTHER PUBLICATIONS

Notification of Reasons for Refusal in Japanese Application No. 2005-072633 mailed Sep. 29, 2009 (with partial English translation).
T. Nakamura et al., "Fast Barrier Synchronization Mechanism of SR11000model H1", IPSJ SIG Technical Report, Information Processing Society of Japan, Nov. 28, 2003, vol. 2003, No. 119, pp. 69-74 (Domestic Society Paper 2004-01964-004) (with partial English translation).
A. Fukuda, "Multiprocessor Operating Systems", 1st Edition, Corona Publishing Co., Ltd., May 20, 1997, pp. 89-104, (Book1999-00093-001) (with partial English translation).

* cited by examiner

*Primary Examiner* — Li B Zhen
*Assistant Examiner* — Blake Kumabe
(74) *Attorney, Agent, or Firm* — Brundidge & Stanger, P.C.

(57) ABSTRACT

Barrier synchronization between multiprocessors is performed at high speed while reducing overhead of parallel processing without adding any special hardware mechanism. A parallel computer synchronization method is provided to synchronize threads through barrier synchronization for parallel execution of plural threads on plural processor modules. The parallel computer has plural processor modules (P0 and P1) equipped with plural processor cores (cpu0 to cpu3). The processor cores are each assigned plural threads (Th0 to Th7) to execute multithread processing. The plural threads (Th0 to Th7) are set in hierarchical groups (Gr), and barrier synchronization is performed on each group separately.

8 Claims, 26 Drawing Sheets

FIG.5
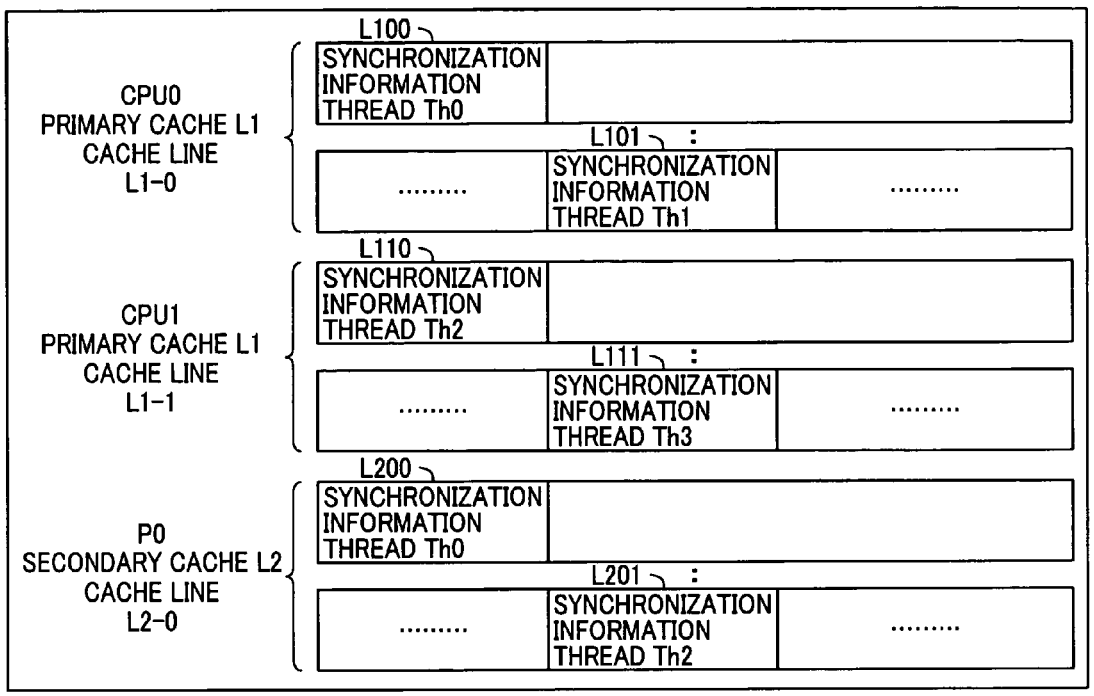
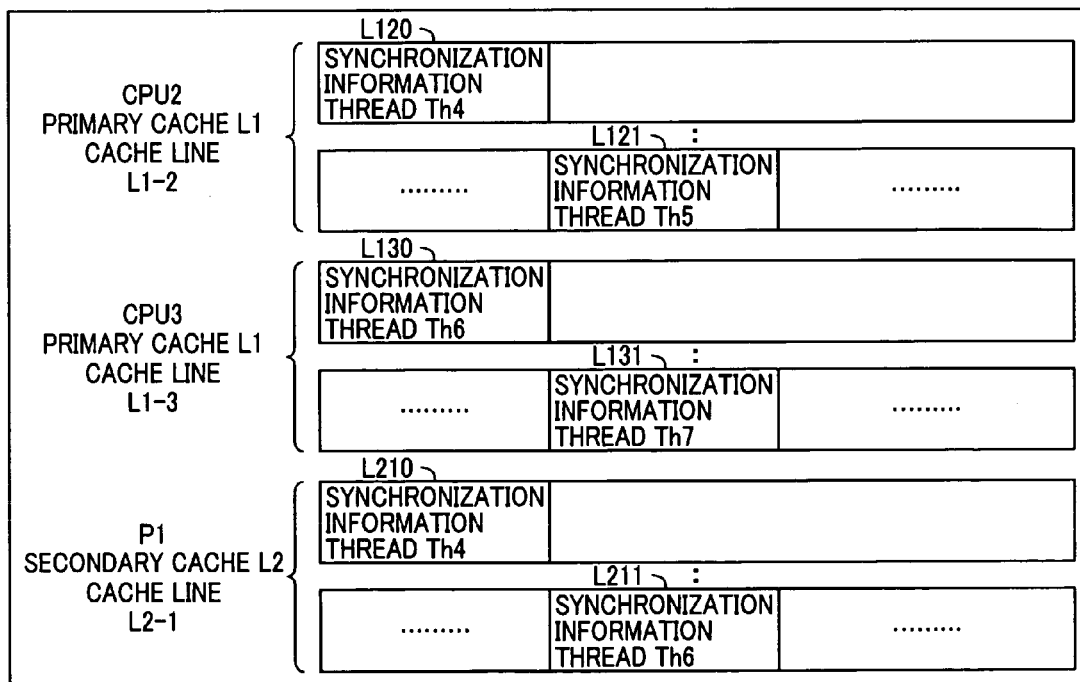

WHEN THREAD COUNT DIFFER FROM ONE CORE TO ANOTHER

FIG.23
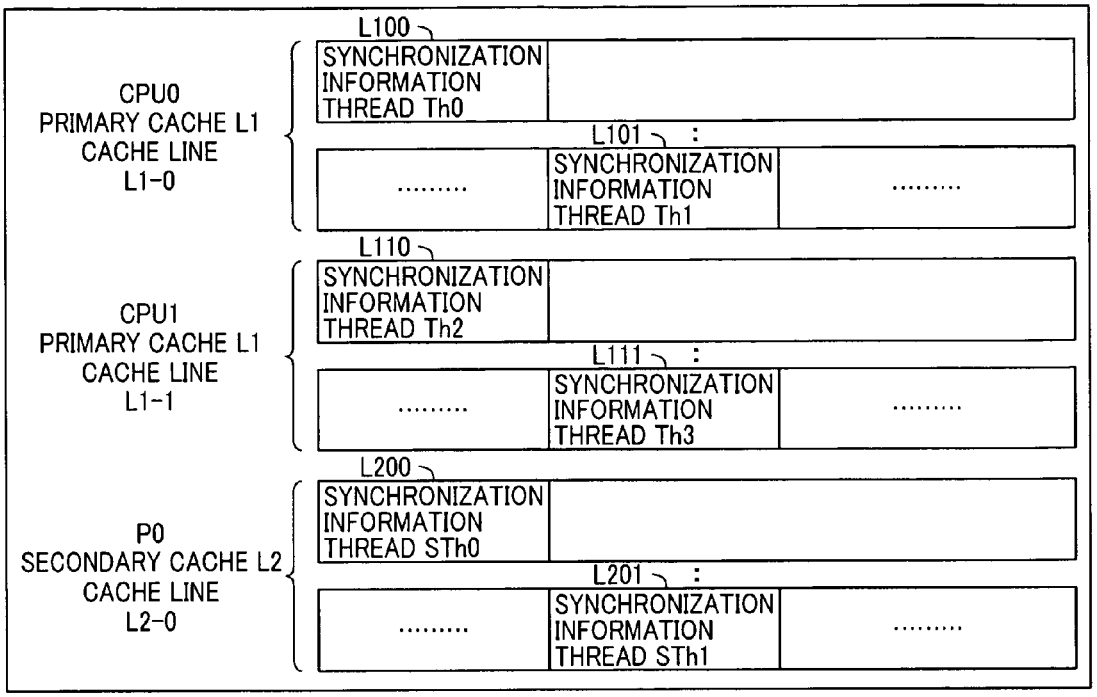
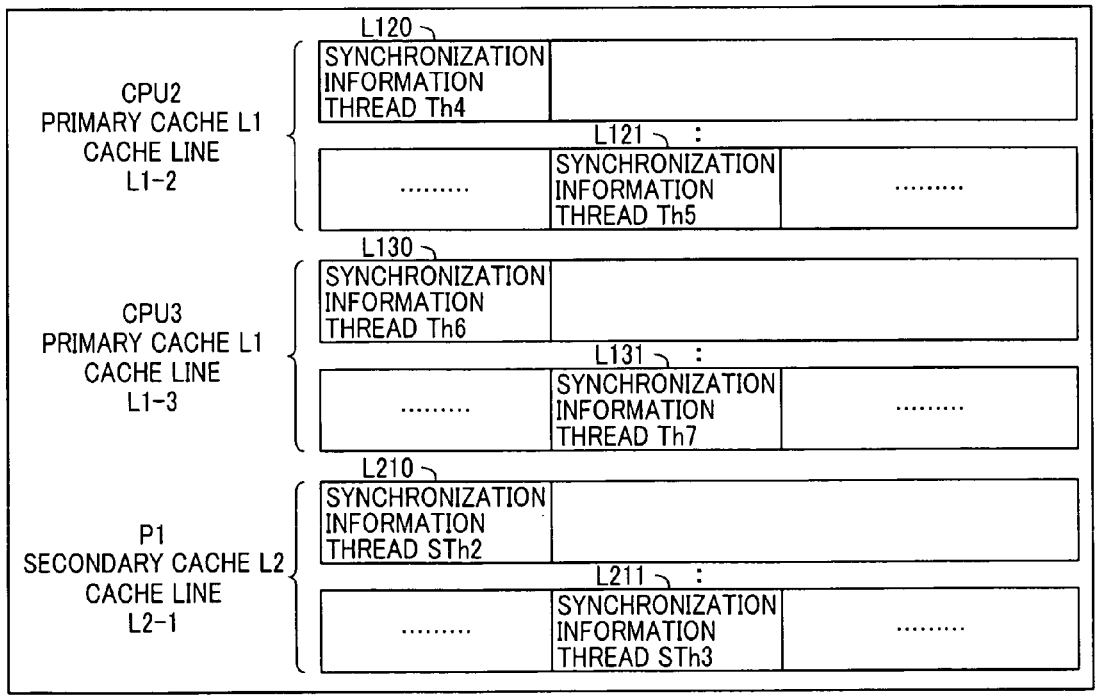

SYNCHRONIZATION METHOD AND PROGRAM FOR A PARALLEL COMPUTER

CLAIM OF PRIORITY

The present application claims priority from Japanese application P2005-72633 filed on Mar. 15, 2005, the content of which is hereby incorporated by reference into this application.

BACKGROUND OF THE INVENTION

This invention relates to barrier synchronization processing in a parallel computer and, more specifically, a computer capable of multiple barrier synchronization operations.

Barrier synchronization is common in parallel computers in which plural processors are each assigned a thread (or process) to compute separately. Through barrier synchronization processing, the processors are synchronized with one another at a barrier synchronization point set to each thread in advance.

For example, in a Symmetric Multiprocessing (SMP) parallel computer, plural symmetric multiple processors share a memory, which enables a thread on each processor to access data stored in the shared memory by other threads and to exchange computation results with other threads. Synchronization processing to confirm that each thread has finished computation up to a preset synchronization point allows the threads to synchronize with one another each time computation processing set in advance is completed and to start next computation simultaneously. The processors are synchronized by keeping each processor from starting on computation beyond its synchronization point until all of the processors reach their synchronization points set by a program in advance. One of known techniques for performing such processor synchronizing processing at high speed is a barrier synchronization mechanism by hardware (see JP 11-312148 A, for example).

A recent trend is to employ a multicore microprocessor in which plural processor cores are mounted to one LSI package, and to improve the processing speed of parallel processing by preparing plural physical processor cores. Further, applications and OSs contribute to smooth and swift parallel processing by dividing one task into plural threads (or processes).

SUMMARY OF THE INVENTION

In the above example of prior art, a hardware barrier synchronization mechanism provides one signal line to one processor (chip), which allows processors to synchronize on one thread but not on plural threads. This leads to a problem in that, when a multicore microprocessor with plural processor cores mounted to one chip is employed for multithread parallel processing, since, whereas the processors are capable of processing plural threads in parallel, synchronization processing can be performed only on one thread and it lowers the efficiency of parallel processing.

The hardware barrier synchronization mechanism may provide signal lines to the processor cores such that the processor cores can synchronize with one another on plural threads. However, it complicates the hardware configuration and pushes up the price of a parallel computer extremely high. Furthermore, in the case where one processor core is assigned plural threads (multithread parallel processing), the hardware barrier synchronization mechanism is capable of synchronization only on one of the plural threads, the efficiency of multithread parallel processing is lost.

This invention has been made in view of the above problems, and it is therefore an object of this invention to synchronize processors on plural threads in a type of parallel processing that assigns plural threads to one processor while keeping the price of a computer from rising.

According to the present invention, there is provided a parallel computer synchronization method for synchronizing threads through barrier synchronization for parallel execution of plural threads on plural processors of a parallel computer, the processors each having plural processor cores, including the steps of: assigning plural threads to each of the processor cores to have the processor cores execute multithread processing; setting the plural threads in hierarchical groups; and performing barrier synchronization on each of the groups separately.

Further, the step of separately performing barrier synchronization on each group includes the steps of: synchronizing threads in the same group through barrier synchronization; and performing barrier synchronization between the groups.

According to this invention, threads that are to receive barrier synchronization are grouped into hierarchical groups, and barrier synchronization processing is performed on each of the synchronization groups separately. The invention thus makes sure that synchronization is achieved on multiple threads when a multicore microprocessor is employed for a type of parallel processing that makes one processor core handle multithread processing.

BRIEF DESCRIPTION OF THE DRAWINGS

FIG. 5 is an explanatory diagram showing an example of how a shared area for data storage is set for each processor module.

FIG. 23 is an explanatory diagram showing an example of how a shared area for data storage is set for a computation thread and a synchronization thread according to the third embodiment.

DETAILED DESCRIPTION OF THE PREFERRED EMBODIMENTS

Embodiments of the present invention will be described below with reference to the accompanying drawings.

First Embodiment

Figure 1:
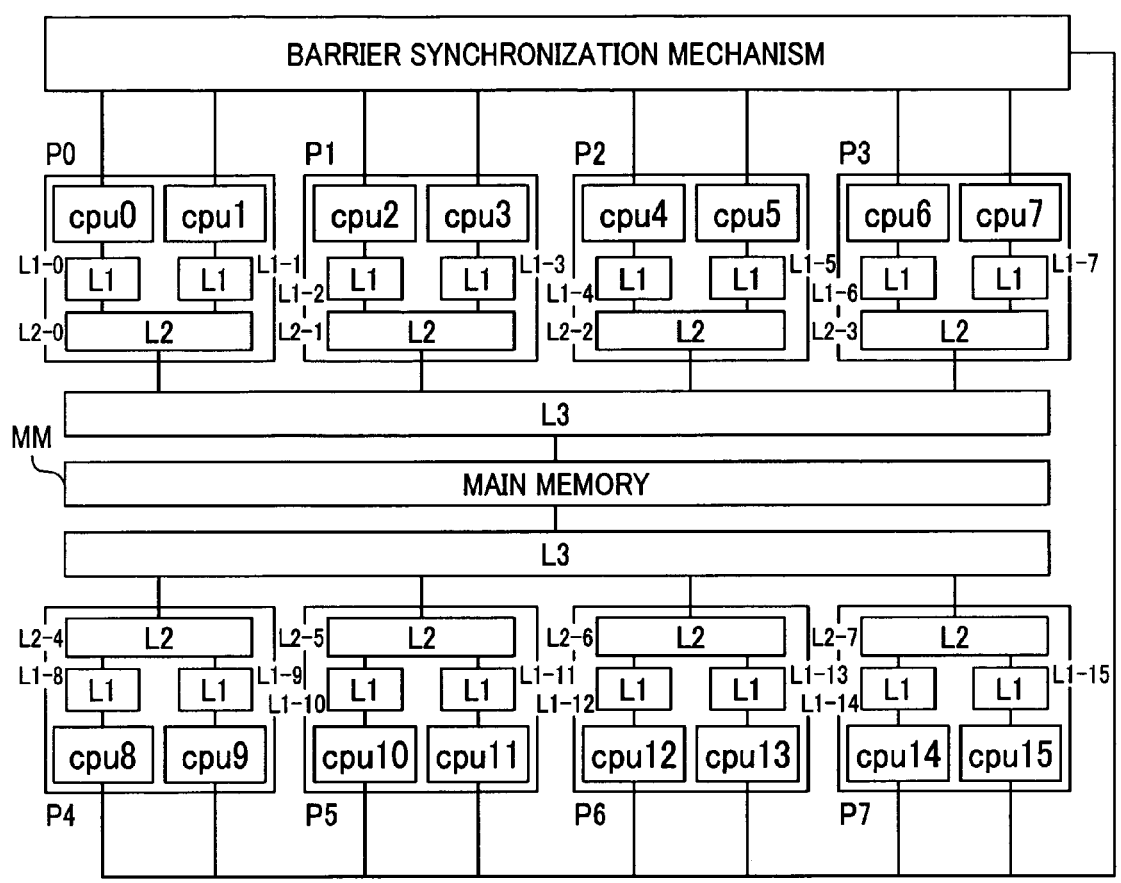
FIG. 1 is a configuration diagram showing a parallel computer that performs barrier synchronization processing according to a first embodiment of this invention.

FIG. 1 shows an example of constructing a parallel computer from a shared memory multiprocessor system with a multicore microprocessor to which a first embodiment of this invention is applied.

<Hardware Configuration>

A parallel computer of FIG. 1 has a multiprocessor composed of plural processor modules (processors) P0 to P7. Plural processor cores (cpu0 to cpu15 of FIG. 1) are mounted to each of the processor modules P0 to P7. Two processor cores are mounted to the processor module P0. The processor module P0 has, for example, the processor cores cpu0 and cpu1, and is capable of running two CPUs in parallel.

The processor cores cpu0 and cpu1 have primary cache memories (hereinafter referred to as primary caches) L1-0 and L1-1, respectively, which are independent of each other. The primary caches L1-0 and L1-1 of the two processor cores cpu0 and cpu1 are connected to one secondary cache memory (hereinafter referred to as secondary cache) L2-0 provided in the processor module P0. The primary caches L1-0 and L1-1 function as shared area for data storages (shared storage portions) that are shared among plural threads executed on the processor cores cpu0 and cpu1. In this embodiment, a thread executed on each processor core may be a unit constituting a program (a process or the like of a program), or may be a program itself. Threads may be constituted of the same processing procedure and process different data from one another to perform parallel processing by barrier synchronization, or may be constituted of different processing procedures from one another and perform parallel processing by barrier synchronization to exchange data.

The secondary cache L2-0 is connected to the two processor cores cpu0 and cpu1 to function as a shared area for data storage that is shared between the processor cores cpu0 and cpu1.

The other processor modules P1 to P7 are each configured in the same way as the processor module P0 described above, and have two processor cores, two primary caches chosen from L1-2 to L1-7, and one secondary cache chosen from L2-1 to L2-7.

The processor modules P0 to P7 are connected to tertiary cache memories (hereinafter referred to as tertiary caches) L3. The tertiary cache L3 function as shared area for data storages that are shared among the processor modules P0 to P3. In an example shown in FIG. 1 the processor modules P0 to P7 share one tertiary cache L3 and the processor modules P4 to P7 (cpu8 to cpu15) share another tertiary cache L3, but all the processor modules P0 to P7 may share one tertiary cache L3. The tertiary caches L3 in FIG. 1 are located in places that correspond to front-side buses of the processor modules P0 to P7, but may instead be in places corresponding to backside buses (not shown) of the processor modules P0 to P7.

The tertiary caches L3 shared among the processor modules P0 to P7 are connected to a main memory MM. The main memory MM is connected to the processor modules P0 to P7 via a controller (not shown) (for example, a switch or a chip set such as northbridge). Through this controller, the processor modules P0 to P7 are connected to external storage system (an HDD, for example) and a network interface. The external storage system stores the program.

The shared area for data storages are arranged hierarchically from the side of the processor cores cpu0 to cpu15 toward the main memory MM in an order that puts the primary caches L1 (first shared area for data storages) first, then the secondary caches L2 (second shared area for data storages), and then the tertiary caches L3 (third shared area for data storages). In the hierarchical structure here, the longer the distance from the processor cores is (the closer the shared area for data storage is to the main memory MM), the wider the sharing range expands, from being shared among threads on the same processor core, to being shared among processor cores, and to being shared among processor modules.

A hardware barrier synchronization mechanism 100, which performs barrier synchronization in parallel processing processed in parallel by processor cores, is connected to the processor cores cpu0 to cpu15.

<Hardware Barrier Synchronization Mechanism>

Figure 3:
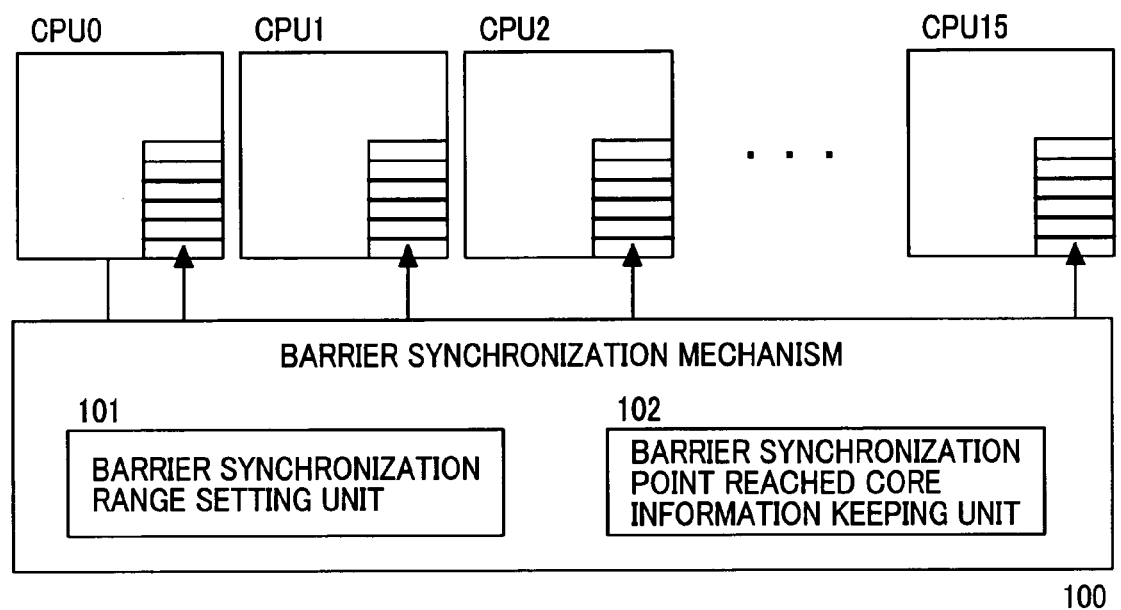
FIG. 3 is a configuration diagram of a hardware barrier synchronization mechanism.

The hardware barrier synchronization mechanism 100 connected to the processor cores cpu0 to cpu15 has, as shown in FIG. 3, a barrier synchronization range setting unit 101, which divides the cpu0 to cpu15 into groups to set a barrier synchronization processing range of group, and a synchronization point arrival information keeping unit (in FIG. 3, barrier synchronization point reached core information keeping unit) 102, which keeps information of a processor core that has reached a barrier synchronization point (barrier synchronization point information) for each of the processor cores cpu0 to cpu15.

As a processor core in a group set by the barrier synchronization range setting unit 101 reaches a given barrier synchronization point, the hardware barrier synchronization mechanism 100 records in the synchronization point arrival information keeping unit 102 the fact that the processor core has reached the barrier synchronization point. When every processor core in this group has reached a barrier synchronization point, the hardware barrier synchronization mechanism 100 notifies every processor core in this group of completion of synchronization. The notification may be made by using interruption as in the above example of prior art, JP 11-312418 A, or by writing information indicating completion of synchronization (a completion flag, for example) in the primary cache memories L1 of the processor cores or other given storage areas as shown in FIG. 3.

<Software Configuration>

Figure 2:
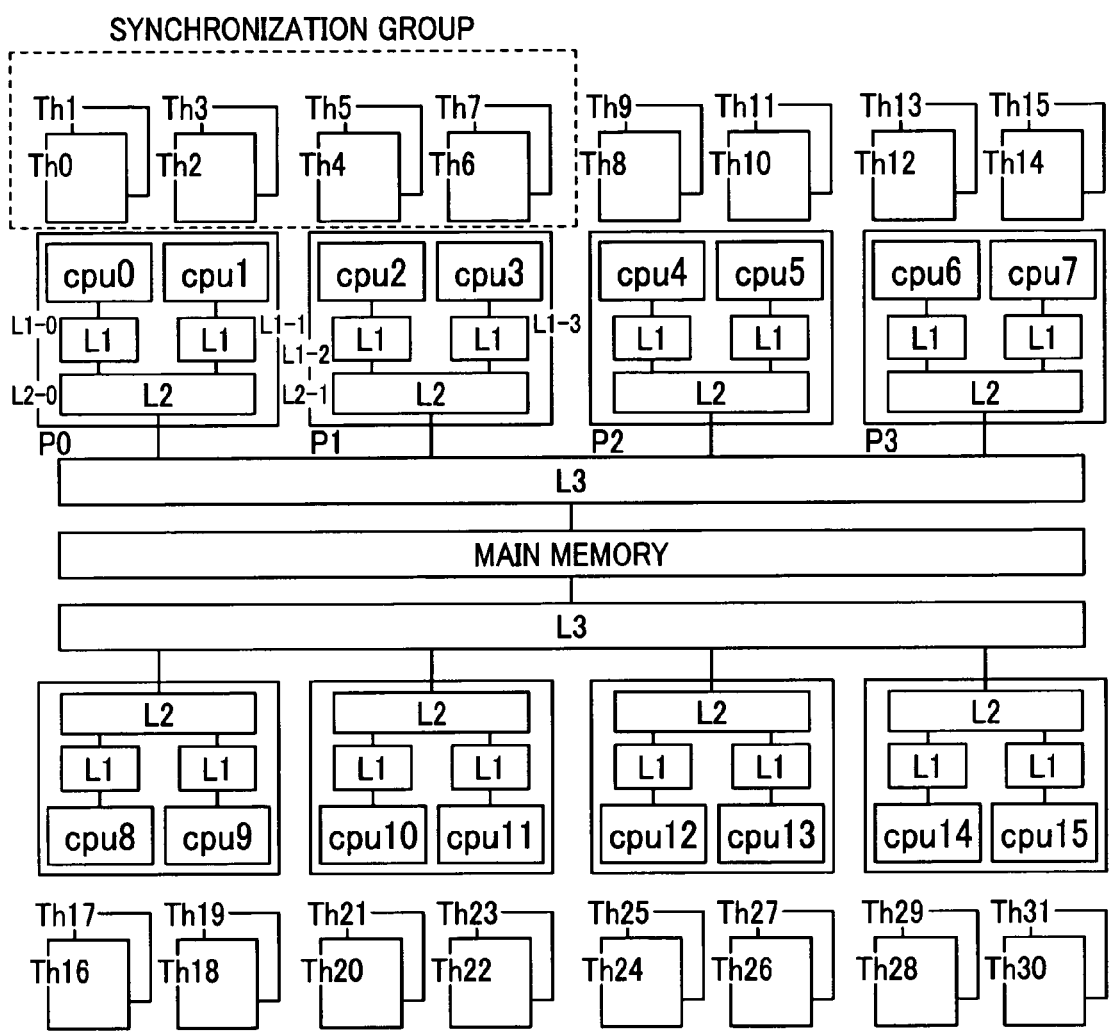
FIG. 2 is a configuration diagram showing software executed in each processor core of the parallel computer of the first embodiment, and an example of a synchronization group on which barrier synchronization processing is performed.

FIG. 2 shows an example of processing executed by the processor cores cpu0 to cpu15. In the example of FIG. 2, cpu0 to cpu15 are each assigned two threads chosen from Th0 to Th31, and thirty-two threads in total are executed in parallel. In other words, one processor module is assigned four threads, and two threads are equally assigned to two processor cores of the module.

In FIG. 2, processor modules (or processor cores) in which barrier synchronization is performed make a synchronization group Gr. The following description takes as an example a case in which the processor cores cpu0 to cpu3 of the processor modules P0 and P1 constitute the synchronization group Gr and barrier synchronization processing is performed on their eight threads Th0 to Th7.

<Barrier Synchronization Group>

Figure 4:
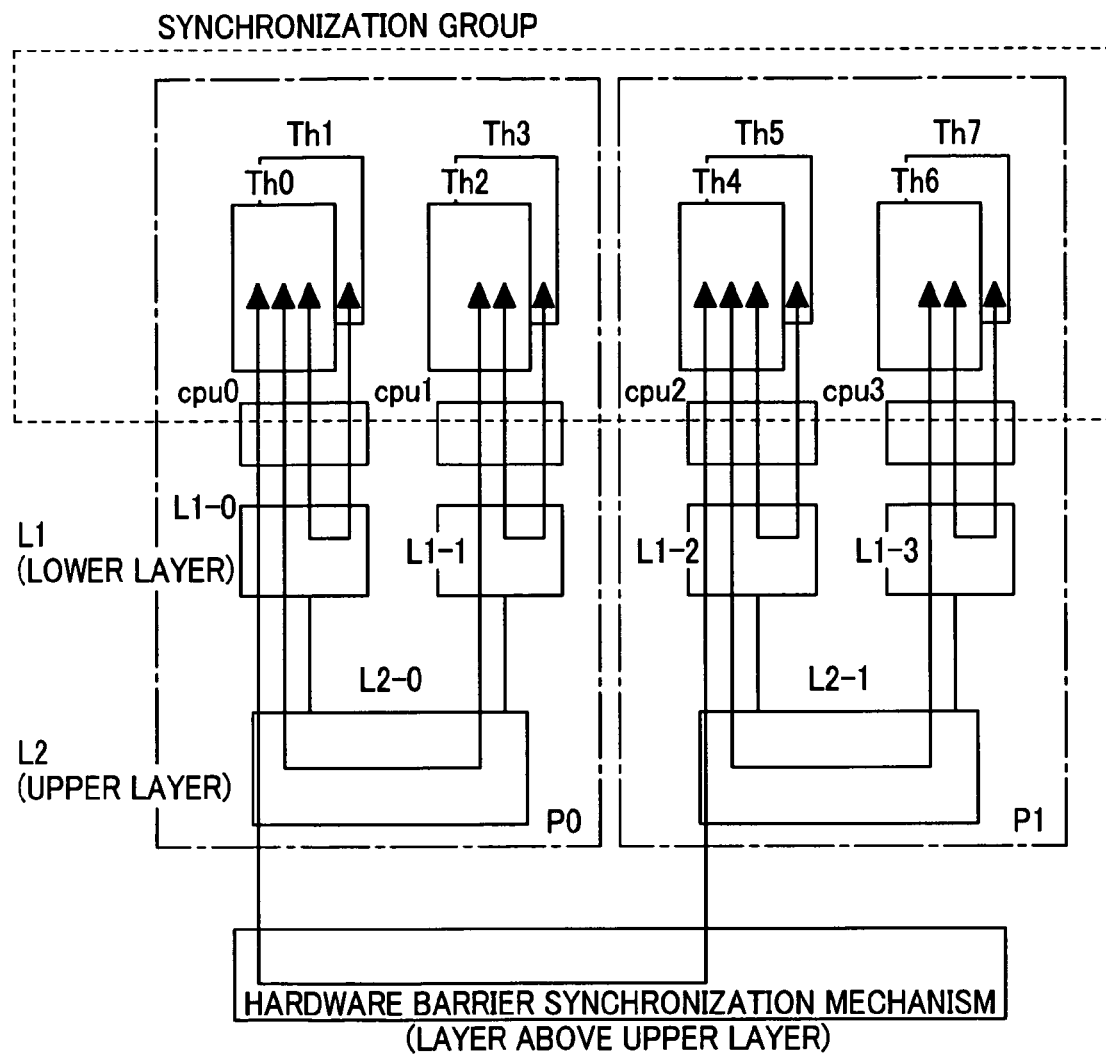
FIG. 4 is an explanatory diagram showing the hierarchical structure of a synchronization group on which barrier synchronization processing is performed by four processor cores.

FIG. 4 illustrates details of the synchronization group Gr shown in FIG. 2.

To perform barrier synchronization processing with eight threads assigned to the processor modules P0 and P1 each having two processor cores, the synchronization group where barrier synchronization processing is to be performed is first broken into a lowermost layer (first layer) group in which barrier synchronization is performed on threads of one processor core, a second layer (upper layer) group in which processor cores in the same processor module are synchronized with each other through barrier synchronization, and a third layer (uppermost layer) group in which processor modules are synchronized with each other through barrier synchronization.

The synchronization group layers are each given a storage area that can be shared throughout the same layer (shared area for data storage). The lowermost layer (first layer) is a first synchronization group in which barrier synchronization is performed on threads of the same processor core. The primary cache L1 that can be shared between the threads of the same processor core serves as a shared area for data storage, and the threads are synchronized by writing synchronization information in the primary cache L1.

The second layer which is the upper layer is a second synchronization group in which processor cores in the same processor module are synchronized with each other through barrier synchronization of threads. The secondary cache L2 that can be shared between the processor cores in the same processor module serves as a shared area for data storage. One thread out of threads assigned to each processor core is chosen as a parent thread, and the parent thread of each processor core writes synchronization information in the secondary cache L2 to synchronize the parent threads with each other.

The third layer (uppermost layer) is a third synchronization group in which processor modules are synchronized with each other through barrier synchronization of threads. One of plural parent threads on the same processor module is chosen as a parent thread of the processor module, and the parent thread of one processor module is synchronized with the parent thread of another processor module. This embodiment uses the hardware barrier synchronization mechanism 100 to synchronize processor modules' parent threads.

In short, a synchronization group layer is set for each shared area for data storage or each layer of the hardware barrier synchronization mechanism.

Each thread constituting a synchronization group is assigned a thread number (thread identifier) as an identifier that is unique throughout the synchronization group Gr. A thread that has the smallest thread number in the same layer is chosen as a parent thread, and remaining threads of the layer serve as child threads.

The lowermost layer (first synchronization group) is a layer in which plural threads of the same processor core are synchronized with one another. In FIG. 4, the processor core cpu0 of the processor module P0 is assigned the threads Th0 and Th1, which constitute a lowermost layer synchronization group for barrier synchronization on the processor core cpu0.

The lowermost layer synchronization group uses the primary cache L1 of the processor core cpu0 as a shared area for data storage. As shown in FIG. 5, a storage area L100, which stores synchronization information of the thread Th0, and a storage area L101, which stores synchronization information of the thread Th1, are set to cache lines set in advance in the primary cache L1-0 of the processor core cpu0. In order to avoid competition for a cache line which occurs when plural threads write in one cache line, cache lines in which threads write information are staggered from each other. Synchronization information can be an ID of the barrier synchronization point (synchronization ID number), a flag, or the like as will be described later.

The threads Th0 and Th1 judge that barrier synchronization of the lowermost layer is completed when synchronization information in the storage area L100 and synchronization information in the storage area L101 match.

The threads Th2 to Th7 on the processor cores cpu1 to cpu3 are set in the same way as the processor core cpu0. The primary caches L1-1 to L1-3 of the processor cores cpu1 to cpu3 are used as shared area for data storages, and storage areas L110, L111, L120, L121, L130, and L131 to store synchronization information of the threads on each of the three processor cores are set to the primary caches L1-1 to L1-3 of the processor cores.

The processor cores cpu0 to cpu3 each choose a thread having the smaller thread number as a parent thread. The parent thread of the processor core cpu0 is the thread Th0. The parent thread of the processor core cpu1 is the thread Th2. Similarly, the parent threads of the processor cores cpu2 and cpu3 are the threads Th4 and Th6, respectively.

The second layer (upper layer) is a layer in which processor cores in the same processor module are synchronized with each other through barrier synchronization. In FIG. 4, in the second layer as the second synchronization group, the parent thread Th0 of the processor core cpu0 of the processor module P0 and the parent thread Th2 of the processor core cpu1 of the processor module P0 use cache lines in the secondary cache L2-0 as shared area for data storages to synchronize with each other. As with cache lines in the primary cache L1-0, cache lines in the secondary cache L2-0 in which the parent threads write synchronization information are staggered from each other in order to avoid competition for a cache line which occurs when plural threads write in the same cache line.

For instance, the second layer synchronization group of the processor module P0 uses, as a shared area for data storage, the secondary cache L2 that is shared between the processor cores cpu0 and cpu1. As shown in FIG. 5, a storage area L200, which stores synchronization information of the parent thread Th0 of the processor core cpu0, and a storage area L201, which stores synchronization information of the parent thread Th2 of the processor core cpu1, are set to cache lines set in advance in the secondary cache L2-0, which is shared between the processor cores cpu0 and cpu1.

The parent threads Th0 and Th2 judge that the second layer barrier synchronization of the processor module P0 is completed when synchronization information in the shared area for data storage L200 and synchronization in the shared area for data storage L201 match.

The threads Th4 to Th7 on the processor cores cpu2 and cpu3 are set in the same way as in the processor module P0. The secondary cache L2-1 of the processor cores cpu2 and cpu3 is used as a shared area for data storage, and storage areas L210 and L211 to store synchronization information of the parent threads Th4 and Th6 of the respective processor cores in the same processor module are set to the secondary cache L2-1. When synchronization information in the shared area for data storage L210 and synchronization information in the shared area for data storage L211 match, it is judged that the second layer barrier synchronization of the processor module P1 is completed.

The third layer (uppermost layer) is a layer in which processor modules are synchronized with each other through barrier synchronization. In the third layer synchronization group of FIG. 4, the parent thread Th0 of the processor core cpu0 of the processor module P0 and the parent thread Th4 of the processor core cpu2 of the processor module P1 are synchronized with each other.

The third layer synchronization group sets, to the barrier synchronization range setting unit 101 shown in FIG. 3, as synchronization subjects, the processor cores cpu0 and cpu2 which execute the parent threads Th0 and Th4 of the processor modules P0 and P1 constituting the synchronization group Gr. This enables the hardware barrier synchronization mechanism 100 to synchronize the parent threads of the processor modules with each other through barrier synchronization.

Settings of the primary caches L1, the secondary caches L2, and the hardware barrier synchronization mechanism 100 for the above synchronization group are set by a program (load module) constituted of the threads Th0 to Th7 as will be described later.

<Software Details>

Figure 6:
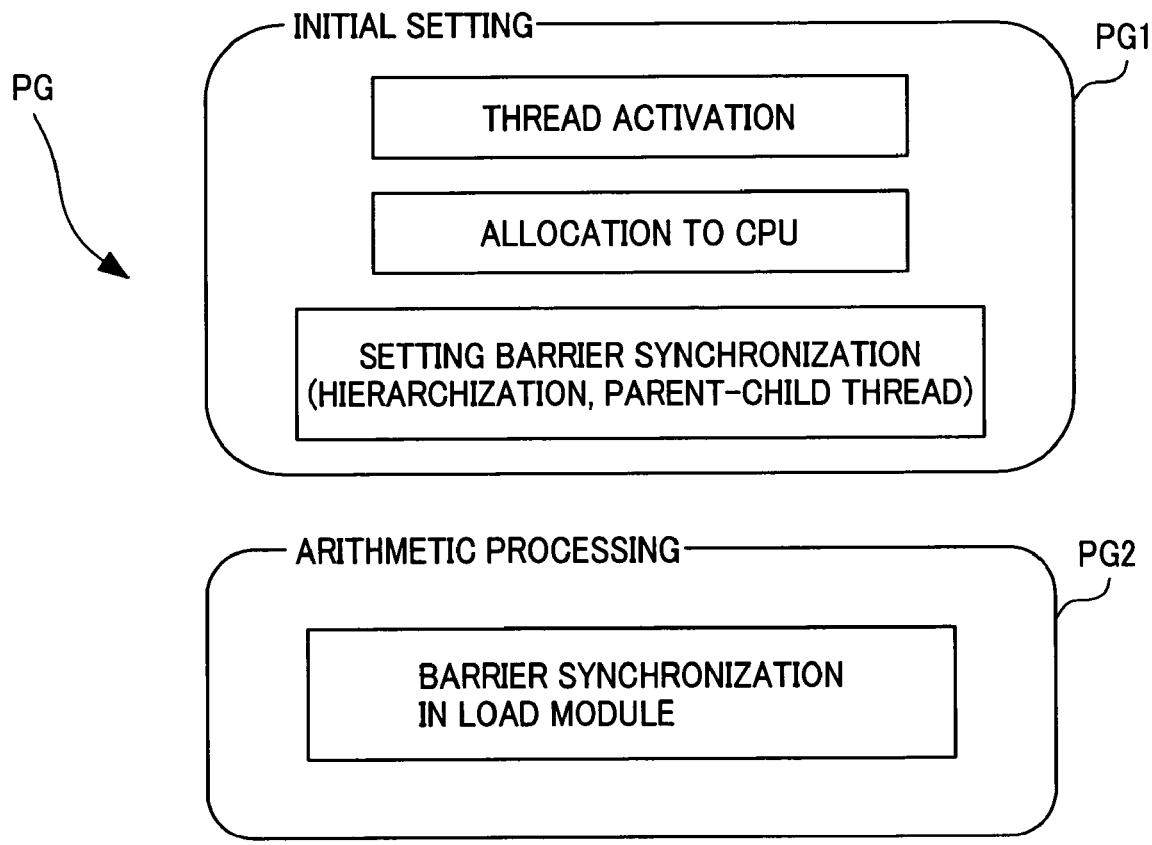
FIG. 6 is a configuration diagram showing an example of a program that performs parallel processing.

FIG. 6 shows the outline of the program (load module) executed in the synchronization group that the processor modules P0 and P1 make.

A program PG executed in a synchronization group is composed of initial setting processing PG1 and computation processing PG2. PG1 activates threads in accordance with resources used by the parallel computer, for example, the count of processor cores to be put in use, assigns the threads to the processor cores, and sets barrier synchronization processing settings. PG2 performs barrier synchronization at a barrier synchronization point, which is set in advance to each thread through given computation.

In the initial setting processing PG1, threads are activated in accordance with resources to be used, and are assigned to designated processor cores or processor cores set in advance. Thereafter, as shown in FIG. 4, a parent-child relation is set to the threads, the synchronization group is broken into hierarchical layers for barrier synchronization, and initialization of barrier synchronization processing is carried out.

In the thus set synchronization group, computation processing is performed on the threads assigned to the processor cores, and barrier synchronization is conducted at a given barrier synchronization point.

The program PG is run by an OS (not shown) or middleware that is executed on the parallel computer.

<Initial Setting>

Figure 7:
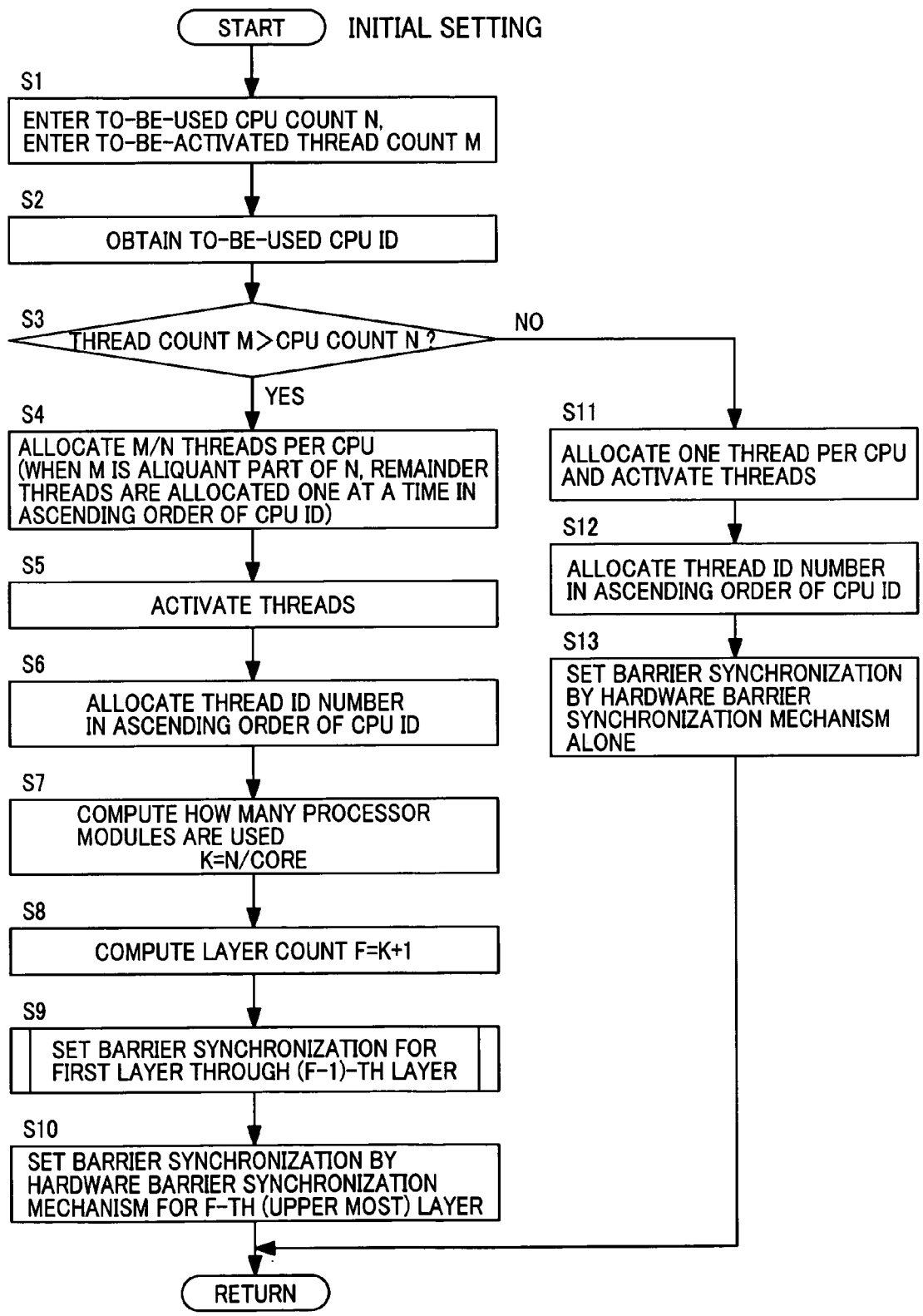
FIG. 7 is a flow chart for initial setting of barrier synchronization processing.
Figure 8:
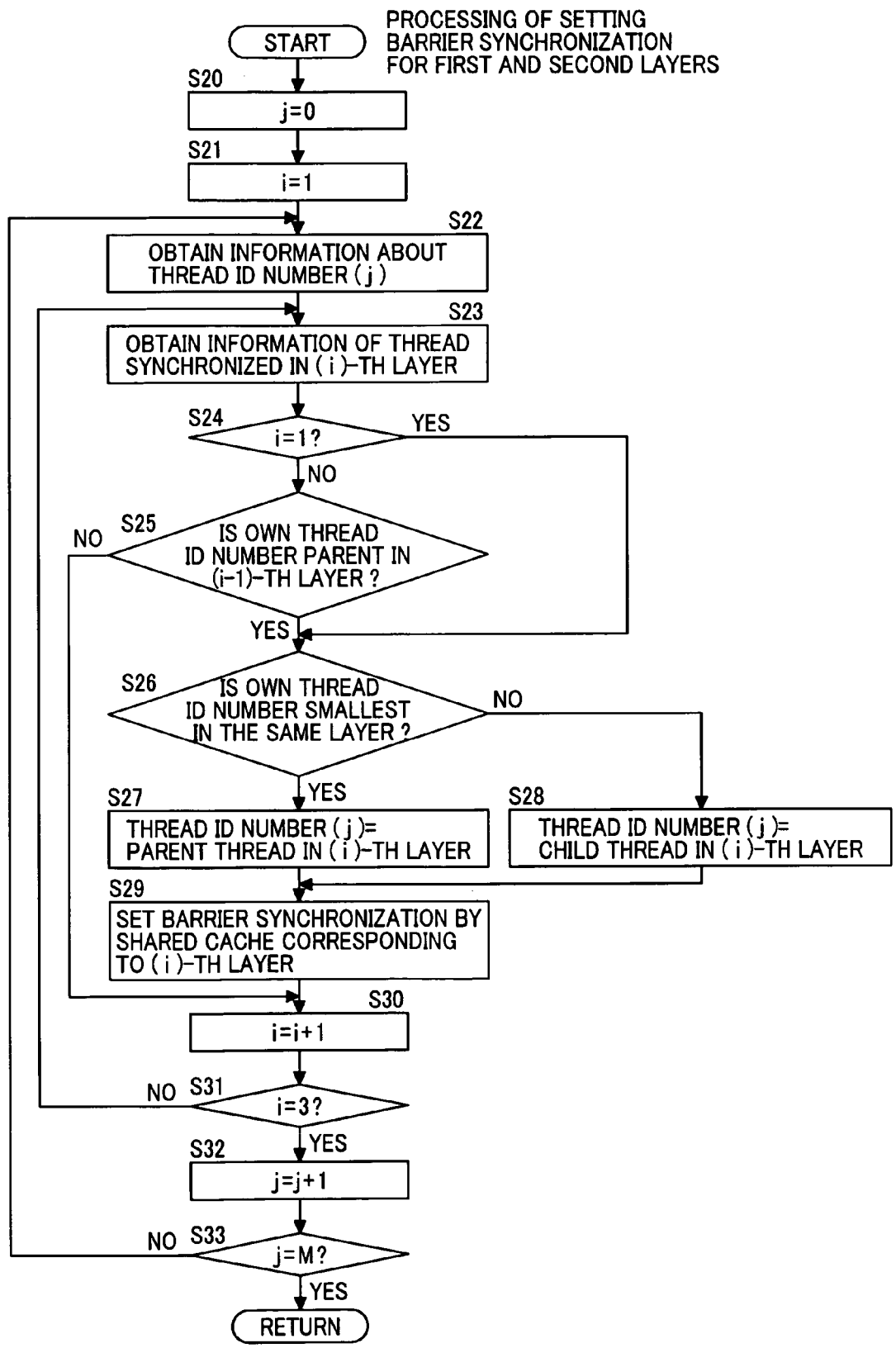
FIG. 8 is a flow chart for initial setting of barrier synchronization processing for first and second layers.
Figure 9:
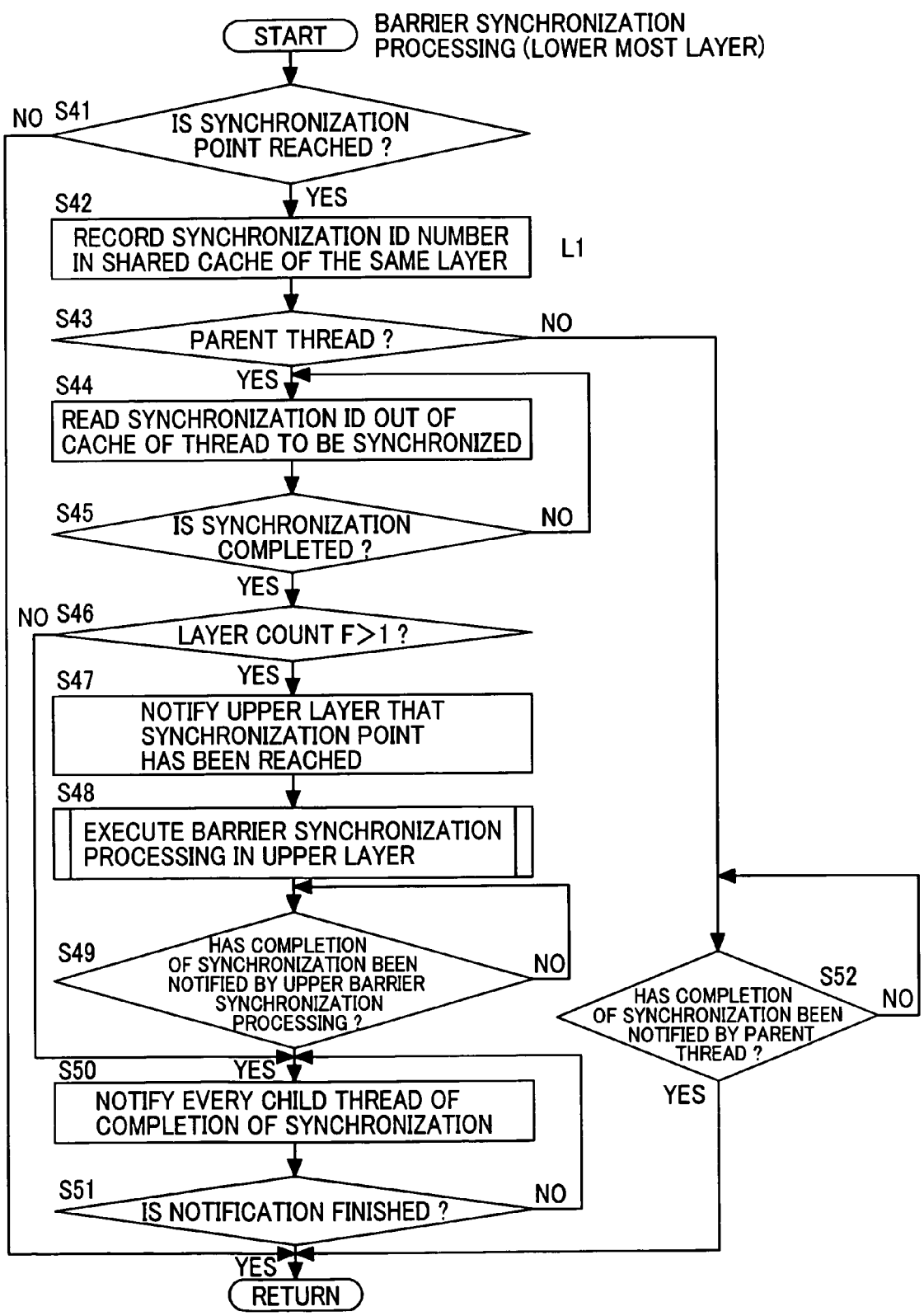
FIG. 9 is a flow chart for barrier synchronization processing showing main routine processing.
Figure 10:
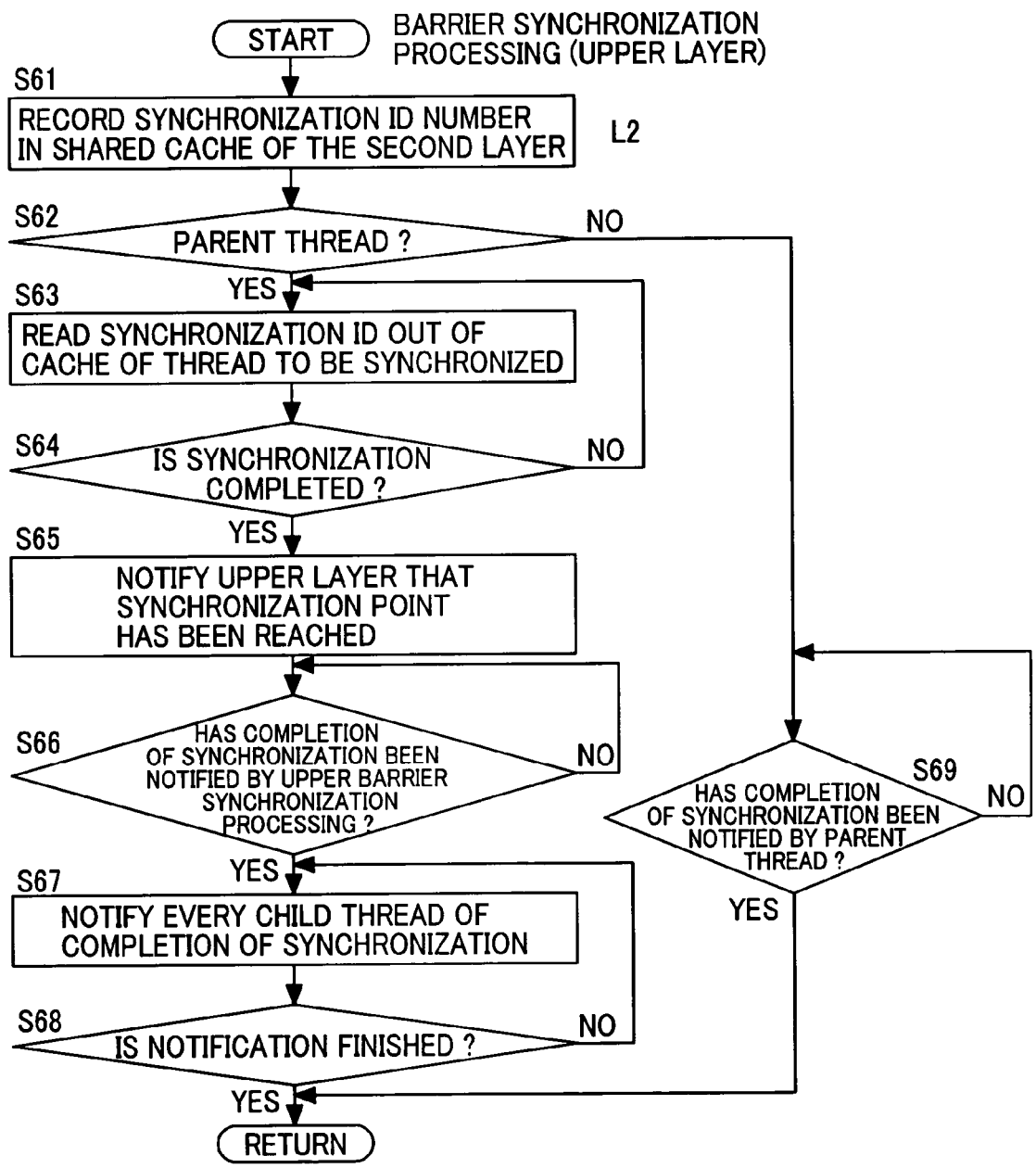
FIG. 10 is a flow chart for upper layer barrier synchronization processing.

FIGS. 7 and 8 are flow charts illustrating details of the initial setting processing PG1, which is a part of the program (load module) PG shown in FIG. 6. FIGS. 9 and 10 are flow charts illustrating details of the barrier synchronization processing part of the computation processing PG2 of the program PG shown in FIG. 6.

In FIG. 7, the initial setting processing PG1 is executed by an arbitrary processor module of the parallel computer. First, in a step S1, how many processor cores (CPUs) to be used (processor core count N) and how many threads are to be activated (thread count M) are entered (M and N are natural numbers). The processor core count N and the thread count M are entered, for example, by an administrator from a management console via a network (not shown). The initial setting processing PG1 sets how many processor cores and threads are to execute the computation processing PG2. The set processor core count N and thread count M are stored in a given storage area of the main memory MM.

In a step S2, the initial setting processing PG1 obtains as many processor core numbers (processor core identifiers, CPU ID in the drawing) as the processor core count N from the OS (not shown) or middleware. In the example of FIG. 4, the processor core count N is four and the thread count M is 8, and when the processor modules P0 and P1 are to be used, the processor core numbers 0 to 3 are obtained.

In a step S3, it is judged whether or not the set thread count M is larger than the processor core count N. In other words, whether it is multithread processing or single thread processing is judged.

The program proceeds to a step S4 in the case of multithread processing where one processor core is assigned plural threads, and to a step S11 in the case of single thread processing where one processor core is assigned one thread. The step S11 through a step S13 for single thread processing are as in the above example of prior art, and one thread is assigned to each processor core number obtained in the steps S1 and S2. The thread assigned to each processor core number is then activated (S11).

Thread number Th(x) is assigned in ascending order of processor core number (S12). The hardware barrier synchronization mechanism 100 is notified of the processor core numbers of the processor cores that execute threads to be synchronized, and is set such that the barrier synchronization processing is performed with the hardware barrier synchronization mechanism 100 alone in the computation processing PG2 (S13).

In the step S4 for multithread processing, one processor core is assigned as many threads as the product of M/N, N being the processor core count (processor core number) set in the step S1 and M being the thread count set in the step S1. Here, the processor cores having processor core numbers i to i+(N−1) are each assigned as many threads as the quotient of M/N. When M is an aliquant part of N, remainder threads are allocated one at a time in ascending order of processor core number. The assigned threads are activated in a step S5.

In a step S6, thread number Th(x), specifically, the thread numbers Th0 to Th(N−1) are assigned, in ascending order of processor core number, to the threads that are assigned to the processor cores having processor core numbers i to i+(N−1). Which processor core number is associated with which thread number is stored in a given storage area of the main memory MM or the like.

In the example of FIG. 4 where N=4 and i=0, the processor cores having processor core numbers 0 to 3 are each assigned two threads. The threads associated with the processor core number 0 (cpu0) are assigned thread numbers (thread IDs) Th0 and Th1. The threads associated with the processor core number 1 (cpu1) are assigned thread numbers Th2 and Th3. Similarly, the threads associated with the processor core numbers 2 and 3 are assigned thread numbers Th4 to Th7. In this way, the association between processor core numbers and thread numbers of threads executed in each processor core is determined, and which processor core executes which thread can be looked up by thread number.

In a step S7, in order to determine the hierarchical structure of the synchronization group Gr, a processor module count K is obtained from the to-be-used processor core count N through the following expression.

$$K = N/\text{CORE} \quad (1)$$

CORE in Expression (1) represents how many processor cores one processor module has (in this embodiment, CORE=2). For versatility, the count N of processor cores in one processor module may be entered in the step S7.

In a step S8, how many layers (a layer count F) are in the barrier synchronization group Gr shown in FIG. 4 is determined from the to-be-used processor module count K, which is obtained in the step S7, through the following expression.

$$F = K + 1 \quad (2)$$

In the example of FIG. 4 where the to-be-used processor module count K is 4/2=2, the layer count F of the barrier synchronization group Gr is 3. The three layers of this barrier synchronization group Gr are a first synchronization group in which threads in the same processor core are synchronized with each other with the use of the primary caches L1, a second synchronization group in which parent threads in the same processor module are synchronized with each other with the use of the secondary caches L2, and a third synchronization group in which the parent thread of the processor module P0 is synchronized with the parent thread of the processor module P1 by the hardware barrier synchronization mechanism 100.

Expression (2) is for when the two processor cores cpu0 and cpu1 share one secondary cache L2-0, and needs to be adjusted in accordance with how the secondary caches L2 and the tertiary cache L3 are shared among processor cores and processor modules. In the case where the layer count F cannot be calculated automatically, or in the case where the calculated layer count F is to be changed, the layer count F may be entered from the management console or the like.

In a step S9, barrier synchronization settings for the first layer (first synchronization group) and the second layer (second synchronization group) are set based on the layer count F of the synchronization group Gr. Specifically, what part of the shared area for data storage (cache or the like) that is used in barrier synchronization stores synchronization information is set for each layer. This processing is conducted following the flow chart of FIG. 8. The reason why barrier synchronization settings are set for the first and second layers alone in the step S9 is that, in this embodiment, barrier synchronization of the third layer is performed by the hardware barrier synchronization mechanism 100.

In a step S20 of FIG. 8, a variable j, which indicates that a thread number Th(j) is to be looked up, is initialized to 0. In a step S21, a variable i, which indicates that an i-th layer is to be looked up, is initialized to 1.

In a step S22, information is obtained of a thread that has the thread number Th(j) as indicated by the current value of the variable j. In a step S23, information is obtained of threads that are synchronized in the i-th layer as indicated by the current value of the variable i (the information to be obtained is the thread numbers or the like of threads synchronized in the same layer).

In a step S24, whether the variable i is 1 or not, in other words, whether it is the first layer or not is judged. In the case of the first layer, the program proceeds to a step S26. In the case of a layer above the first layer, the program proceeds to a step S25.

In the step S25, whether or not the currently looked up thread Th(j) is a parent thread in a layer that is one layer below ((i−1)-th layer). The program proceeds to the step S26 when the looked-up thread Th(j) is a parent thread in a layer that is one layer below and, when it is not, the program proceeds to a step S30 to move on to the next loop.

In the step S26, it is judged whether or not the looked up thread has the smallest thread number Th(j) of the threads that constitute the i-th layer, which is currently looked up. In the case where the looked up thread has the smallest thread number Th(j) in the same layer, this thread serves as the parent thread of the i-th layer (S27) and, if not, serves as a child thread of the i-th layer (S28).

After the parent-child relation is set to threads in the same layer in the steps S27 and S28, an area to store synchronization information of the parent thread and an area to store synchronization information of the child threads are set in a step S29 in a shared area for data storage that is used by the i-th layer.

Completion of processing for the currently looked up layer is followed by a step S30, where 1 is added to the value of the variable i to look up the next layer. In a step S31, whether or not the layer indicated by the variable i after the addition is the uppermost layer (in this embodiment, the third layer) is judged. When the indicated layer is the uppermost layer, the program proceeds to a step S32 to look up the next thread. When the indicated layer is not the uppermost layer, the program returns to the step S23 to set, for the next layer, barrier synchronization using a shared area for data storage.

In the step S32 where the uppermost layer of the synchronization group Gr has been reached, 1 is added to the value of the variable j, which indicates a thread number Th(j) to be looked up. Thus the next thread number is looked up in order to set synchronization group settings for the next thread.

In a step S33, whether or not the variable j after the addition exceeds the last thread number Th(M−1) is judged and, when the variable j does not exceed the last thread number Th(M−1), the program returns to the step S22 where the next thread is looked up. When the variable j exceeds the last thread number Th(M−1), on the other hand, the sub-routine of the steps S20 to S33 is ended and the program moves to the step S10 of FIG. 7.

In the step S10 of FIG. 7, barrier synchronization settings are set for the third layer (third synchronization group) in which threads of different processor modules are synchronized through barrier synchronization. In this embodiment, where the third layer is the uppermost layer and the hardware barrier synchronization mechanism 100 performs barrier synchronization of the third layer, a thread having the smallest thread number of the threads executed by the same processor module is chosen from each processor module of the synchronization group Gr. Processor cores that execute the chosen threads are set in the barrier synchronization range setting unit 101, to thereby set barrier synchronization settings for the third layer.

Shown below is barrier synchronization initial setting performed in the example of FIG. 4 according to the flow charts of FIGS. 7 and 8.

In the example of FIG. 4 where the to-be-used processor core count N is 4 and the thread count M is 8, it is multithread processing and two threads are assigned per processor core. Four processor cores are allocated to the processor modules P0 and P1, and processor core numbers cpu0 to cpu3 are used (S1 to S3).

Thread number Th is given, in ascending order of processor core number, to the threads that are assigned to the processor cores cpu0 to cpu3. As a result, the threads Th0 to Th7 are set as shown in FIG. 4 (S4 to S6).

The processor core count CORE of each processor module is 2 and therefore the to-be-used processor module count is 2. Accordingly, the layer count F of the synchronization group Gr is 3 and the synchronization group Gr is composed of three barrier synchronization groups (S8).

Next, the first layer, second layer, and third layer barrier synchronization settings are set for each thread through the barrier synchronization setting sub-routine of FIG. 8.

Since i=1 and j=0 (S20 and S21), the first layer barrier synchronization settings for the thread Th0 are set first. The thread Th0 is executed by the processor core cpu0, and is synchronized with the thread Th1 as a thread in the same processor core cpu0 that constitutes the first layer (S22 and S23).

The thread number 0 of the currently looked up thread Th0 is compared against the thread number of the other thread in the first layer, and is found to be smaller than the other. Accordingly, the thread Th0 serves as the parent thread of the first layer (S26 and S27).

As a shared area for data storage that is used by the first layer, the storage area L100 to store synchronization information is set at the head of a given cache line of the primary cache L1-0 (S29). This completes the first layer barrier synchronization settings.

The program then returns to a step S23 of FIG. 8, and the variable i is set to 2 to set the second layer barrier synchronization settings for the thread Th0. In the second layer barrier synchronization, processor cores in the same processor module are synchronized with each other through barrier synchronization, and the threads Th2 and Th3 of cpu1 are synchronized as shown in FIG. 4 (S23).

The thread Th0 which is looked up currently serves as a parent thread in the layer one layer below, and therefore the thread number of the thread Th0 is compared against the thread numbers of the threads Th2 and Th3 of the processor core cpu1. Since the thread number 0 of the thread Th0 is the smallest of the three, the thread Th0 is set as the parent thread of the second layer (S26 and S27).

As a shared area for data storage that is used by the second layer, the storage area L200 to store synchronization information is set at the head of a given cache line of the secondary cache L2-0 (S29). This completes the second layer barrier synchronization settings. Thereafter, the variable i is incremented by 1 and becomes 3, and the next thread to be looked up is Th1. The program then returns to the step S22.

In the manner described above, information is obtained of threads in the same layer, and barrier synchronization settings are set in order starting from the first layer. Since the thread number 1 of the thread Th1 is not the smallest in the first layer, the thread Th1 is set as a child thread of the first layer, and synchronization information of the thread Th1 is stored in the second storage area L101 on the given cache line of the primary cache L1-0, which is used by the first layer (S29).

The thread Th1 is not a parent thread in the layer that is one layer below (the first layer), and therefore is not set as a thread to be synchronized in the second layer barrier synchronization. This completes the second layer barrier synchronization settings for the thread Th1.

For the remaining threads Th2 to Th7, the first layer, second layer, and third layer barrier synchronization settings are set in the manner described above. Lastly, the threads Th0 and Th4, which are the parent threads of the processor modules P0 and P1, respectively, are set as a synchronization group in the hardware barrier synchronization mechanism 100, and this completes the barrier synchronization settings for the third layer, namely, the uppermost layer. The third layer barrier synchronization performed by the hardware barrier synchronization mechanism 100 is completed when barrier synchronization of the threads Th0 and Th4 in the same layer is completed.

<Barrier Synchronization Processing>

A description is given with reference to the flow charts of FIGS. 9 and 10 on barrier synchronization processing, which is a part of computation processing performed by processor modules that are assigned threads through the initial setting shown in FIGS. 7 and 8. FIG. 9 shows processing performed in the lowermost layer (first layer) while FIG. 10 shows processing performed in the upper layer (second layer), and each processing is executed in regular cycles. Barrier synchronization of the third layer, which is the uppermost layer, uses the hardware barrier synchronization mechanism 100, and a flow chart for the third layer barrier synchronization processing is therefore omitted.

In FIG. 9, the first layer synchronization group is processed as follows. First, whether the computation processing has reached a given synchronization point or not is judged in a step S41. In the case where the given synchronization has been reached, barrier synchronization processing of a step S42 and subsequent steps is carried out. In the case where the given synchronization point has not been reached yet, the computation processing is continued.

In the step S42 where the synchronization point has already been reached, the ID of the synchronization point (a synchronization position identifier=synchronization information) is written in a given storage area of the primary cache L1, which is the shared area for data storage of the first layer.

In a step S43, whether or not the own thread is a parent thread is judged. When the thread is judged as a parent thread, processing of a step S44 and subsequent steps is carried out. When the thread is judged as a child thread, the program moves to a step S52 to wait for a notification with which the parent thread of the same first layer informs the child thread that a synchronization point has been reached (a synchronization completion notification). Upon reception of the notification, the synchronization processing is ended and the next computation processing is started. The synchronization completion notification is issued by writing information that indicates completion of synchronization in the storage area as described above.

In the step S44 where the current thread is a parent thread, the synchronization point ID of a child thread in the same first layer is read out of a given cache line in the primary cache L1.

In a step S45, whether or not the synchronization point ID of the parent thread matches the synchronization point ID of every child thread is checked. When it is a match, the program judges that the barrier synchronization is completed, and proceeds to a step S46. When it is not a match, the program waits until the synchronization point ID of every child thread matches the synchronization point ID of the parent thread.

In the step S46, the program judges whether or not the synchronization group layer count F obtained in the step S8 of the initial setting is larger than 1, in other words, whether or not there is a layer above the first layer. When there is an upper layer, the program proceeds to a step S47. When there is no other layer than the first layer, the program proceeds to a step S50.

In the step S47, the upper layer (second layer) is notified of completion of the first layer barrier synchronization. In a step S48, barrier synchronization processing of the upper layer (second layer) is carried out as shown in FIG. 10.

In a step S49, the program waits for a synchronization completion notification from the upper layer (second layer) barrier synchronization processing. Upon reception of the synchronization completion notification from the upper layer, the program proceeds to the step S50, where every child thread is notified of completion of the barrier synchronization.

In a step S51, the child threads are notified of completion one by one and, after all the child threads are notified, the barrier synchronization processing is ended to start the next computation processing.

Specifically, in the example of FIG. 4, the thread Th0 is the parent thread in the first layer and, accordingly, once finishing its own synchronization, writes its synchronization point ID in the storage area L100 of the primary cache L1-0 shown in FIG. 5. Then the thread Th0 monitors the storage area L101 of the thread Th1, which is a child thread.

As the same synchronization point ID is written in the storage area L101 of the child thread Th1, whether or not the layer count F of the synchronization group is 2 or more is judged. Then the second layer barrier synchronization processing shown in FIG. 10 and described later is carried out.

After the processing of FIG. 10 is ended, the parent thread waits for a synchronization completion notification from the second layer, which is an upper layer of the first layer. Upon reception of the synchronization completion notification from the second layer, the parent thread notifies every child thread (in this example, the thread Th1) of completion of the synchronization. After it is confirmed that every child thread has received the synchronization completion notification, the barrier synchronization processing is finished and the next computation processing is started. Threads are synchronized by executing the above processing each time a barrier synchronization point is reached.

The upper layer (second layer) barrier synchronization processing of FIG. 10 is described next.

The processing of FIG. 10 is executed after barrier synchronization of the lower layer is completed. In a step S61, since the own thread has already reached a synchronization point, the thread writes its synchronization point ID in a given storage area of the secondary cache L2, which is a shared area for data storage used by the second layer.

In a step S62, which thread is a parent thread and which thread is a child thread is judged. In the case where the current thread is a parent thread, the parent thread monitors a storage area in the secondary cache L2 that is used by a child thread to be synchronized. At the time when the synchronization point ID of every child thread becomes a match, it is judged that the second layer synchronization and the lower layer synchronization are completed, and barrier synchronization processing of an upper layer (in this example, the hardware barrier synchronization mechanism 100) is notified of completion of the synchronization (S63 to S65). The notification is issued by writing information indicating completion of the synchronization in the secondary cache L2.

In a step S66, the program waits for a synchronization completion notification from the upper layer (third layer) barrier synchronization processing (hardware barrier synchronization mechanism 100). Upon reception of the synchronization completion notification from the third layer, every child thread is notified of completion of the barrier synchronization in a step S67. In a step S68, as every child thread receives the synchronization completion notification, the upper layer barrier synchronization processing is finished and the program returns to the processing of FIG. 9.

In the example shown in FIG. 4, the above barrier synchronization processing is performed as follows. First, at the time when the thread Th0, which is the parent thread in the first layer and the second layer, reaches a barrier synchronization point in the processing of FIG. 9, the thread Th0 writes the ID of the barrier synchronization point in the storage area L100 of the primary cache L1-0 shown in FIG. 5 (S42). Then the thread Th0 monitors the storage area L101 of the child thread Th1 and waits until the matching synchronization point ID is written in the storage area L101 (S45). As the synchronization point ID in the storage area L100 matches the synchronization point ID in the storage area L101, the second layer is notified of completion of the first layer synchronization. This completes synchronization of the threads Th0 and Th1 in the same processor core cpu0.

Thereafter, the processing of FIG. 10 is started to perform barrier synchronization processing on the second layer. Having reached a synchronization point, the thread Th0 writes the ID of the synchronization point in the storage area L200 of the secondary cache L2-0 which is used in the second layer barrier synchronization processing (S62). Then the thread Th0 monitors the storage area L201 of the child thread Th2 and waits until the matching synchronization point ID is written in the storage area L201 (S65). As the synchronization point ID in the storage area L200 matches the synchronization point ID in the storage area L201, barrier synchronization of the second layer is completed. The third layer (hardware barrier synchronization mechanism 100) is notified of completion of the second layer synchronization.

Thereafter, the second layer barrier synchronization processing waits for a synchronization completion notification from the hardware barrier synchronization mechanism 100 (S68). Detecting that synchronization of the threads Th0 and Th4 in the third layer is completed, the hardware barrier synchronization mechanism 100 notifies the threads Th0 and Th4 in the second layer of completion of the synchronization. Based on this synchronization completion notification, the thread Th0 in the second layer notifies the child thread Th2 in the second layer of completion of the synchronization. Once every child thread receives the synchronization completion notification, the second layer barrier synchronization processing is completed (S69 and S70).

The program then returns to the first layer barrier synchronization processing of FIG. 9. Upon reception of the synchronization completion notification from the second layer barrier synchronization processing (S48), the child thread Th1 of the first layer is notified of completion of the synchronization. Once every child thread is notified, the barrier synchronization processing is completed.

As has been described, synchronization groups hierarchized from storage areas close to processor cores toward the main memories MM are set in a processor core and in a processor module, barrier synchronization processing is performed on each of the synchronization groups, and the hardware barrier synchronization mechanism 100 is used only for barrier synchronization processing of the uppermost layer. This ensures that synchronization of multiple threads is achieved successfully in a type of multithread parallel processing that employs a multicore microprocessor to assign plural threads to one processor core.

This makes barrier synchronization possible in a type of multithread parallel processing that employs a multicore microprocessor while using the existing hardware barrier synchronization mechanism 100. Accordingly, multiple threads can be synchronized with one another through barrier synchronization without raising the price of the parallel computer.

Threads in the same processor core are synchronized with the use of the primary cache L1 of the processor core whereas threads in the same processor module are synchronized with the use of the secondary cache L2 in the processor module. This enables each parent thread to access a shared area for data storage that is of least delay, thereby quickening the processing speed and accordingly the speed of parallel processing.

A shared area for data storage used for barrier synchronization processing of one layer is placed in storage (a cache or a main memory) that is different from where a shared area for data storage used for barrier synchronization processing for another layer is located. This ensures that competition for a storage area among different synchronization groups is avoided, and barrier synchronization processing can be performed correctly.

Barrier synchronization between threads in a processor core or between processor cores is carried out by software using a shared area for data storage of small access latency from the processor core, such as the primary cache L1 or the second cache L2, whereas the hardware barrier synchronization mechanism 100 is used in barrier synchronization between processor module and in other barrier synchronization where the access latency from the processor core is large. This makes it possible to finish barrier synchronization from the lowermost layer to the uppermost layer quickly.

Figure 11:
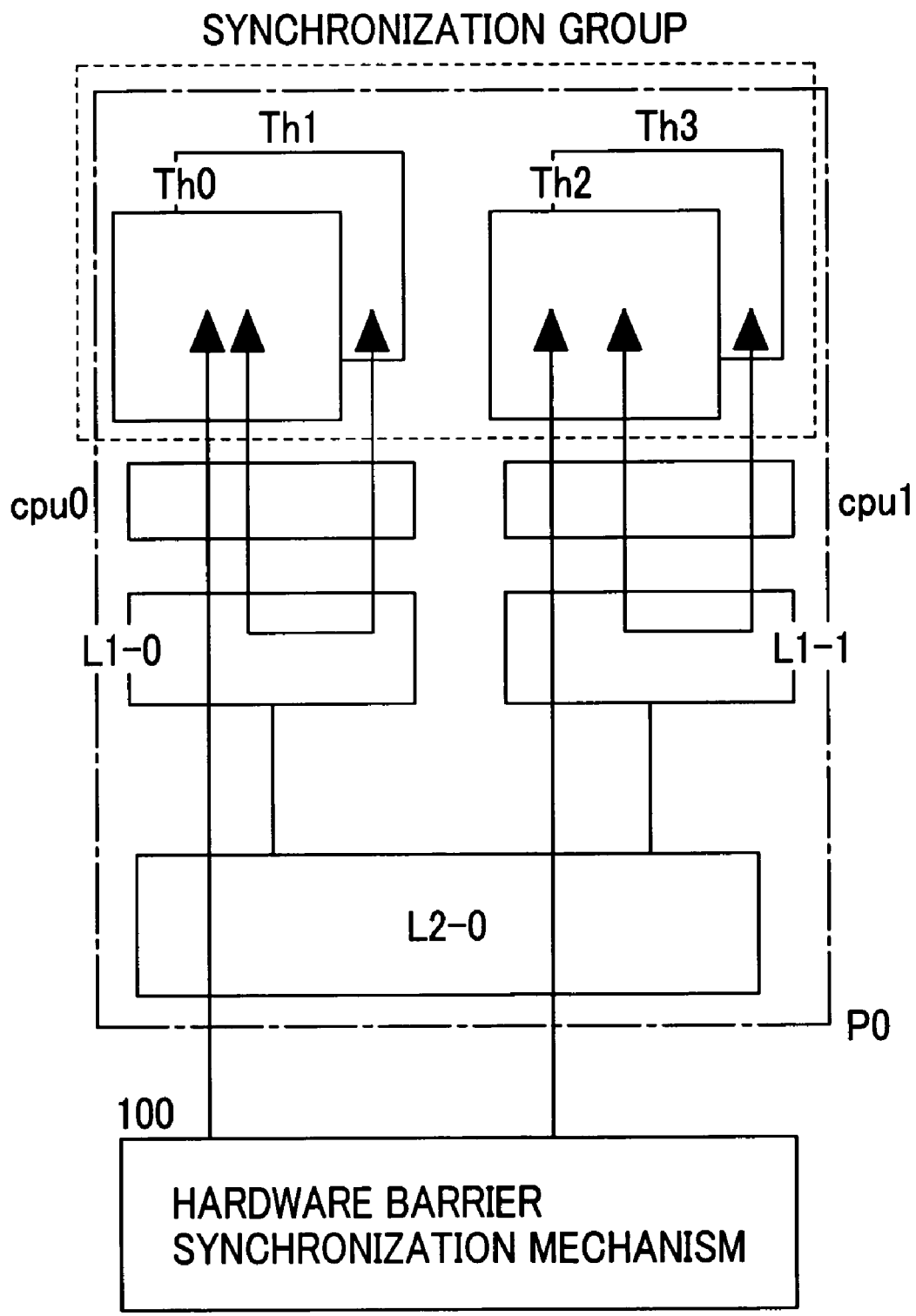
FIG. 11 is an explanatory diagram showing the hierarchical structure of a synchronization group on which barrier synchronization processing is performed by one processor module.

FIG. 11 shows an example in which the layer count F is 2, four threads Th0 to Th3 are assigned to two processor cores cpu0 and cpu1, and synchronization groups are formed in one processor module P0.

The processor core cpu0 is assigned two threads Th0 and Th1 and the processor core cpu1 is assigned tow threads Th2 and Th3, so that threads in the same processor core form a first layer synchronization group.

The thread TH0 of the processor core cpu0 and the thread Th2 of the processor core cpu1 serve as the parent threads of the respective processor cores, and this second layer uses the hardware barrier synchronization mechanism 100 in barrier synchronization. This example differs from FIGS. 7 to 10 in that the second layer is treated as the uppermost layer by using the hardware barrier synchronization mechanism 100, instead of the secondary cache L2, in barrier synchronization between processor cores.

Figure 12:
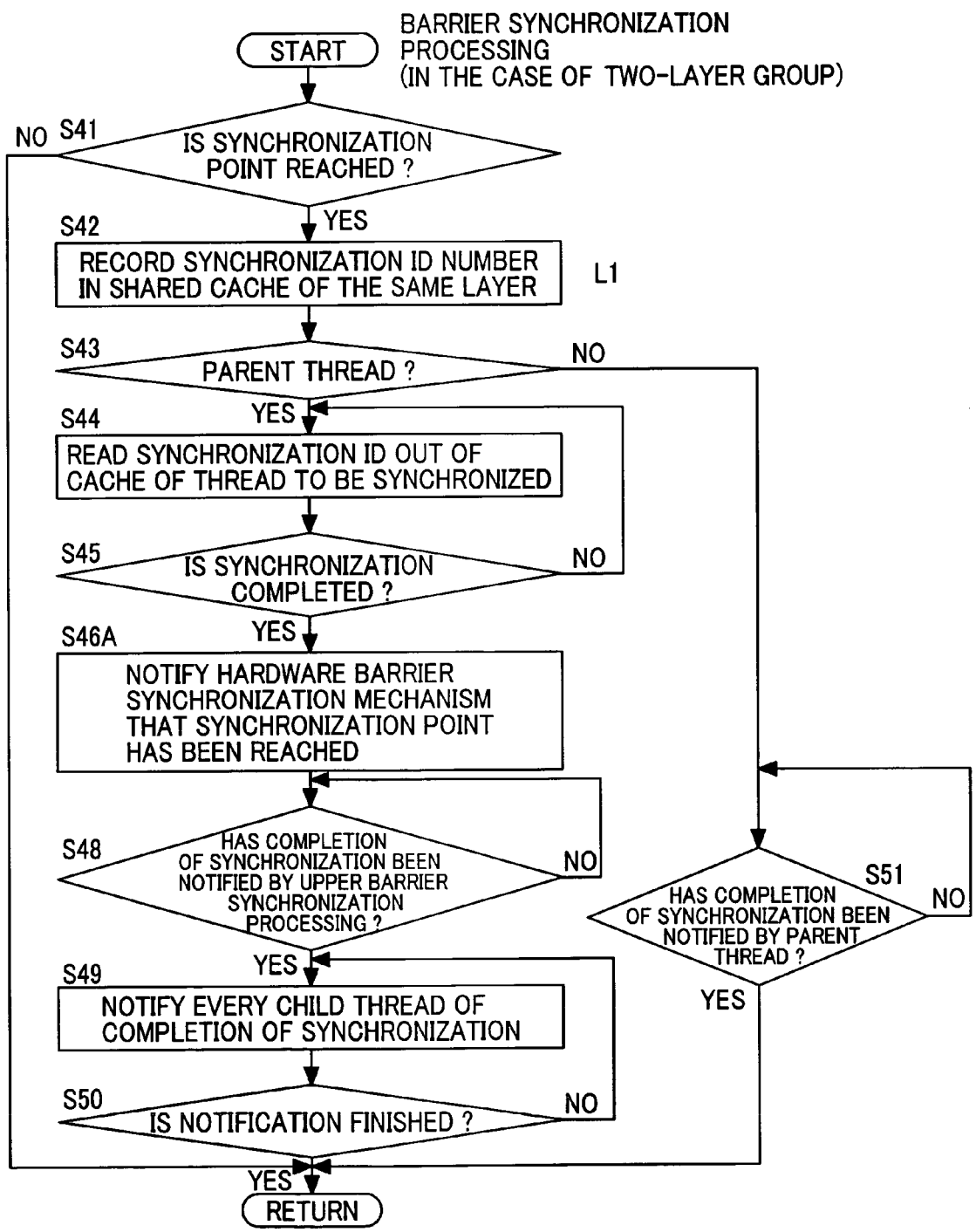
FIG. 12 is a barrier synchronization flow chart for a case where barrier synchronization processing is performed by one processor module.

FIG. 12 is a flow chart showing an example of barrier synchronization processing for when the hardware barrier synchronization mechanism 100 is used in synchronization of the second layer as in FIG. 11. The processing shown in the flow chart of FIG. 12 is executed in place of the flow chart of FIG. 9.

FIG. 12 is the same as FIG. 9 from the steps S41 through S45. Reaching a barrier synchronization point, the thread writes the ID of the synchronization point in a given area of the primary cache L1, which is a shared area for data storage of the first layer. When this thread is a parent thread, the thread waits for the arrival of the child thread at the barrier synchronization point.

As the synchronization is completed, the parent thread notifies, in a step S46A, the hardware barrier synchronization mechanism 100 of completion of the synchronization.

In the step S48, the parent thread waits for a synchronization completion notification from the hardware barrier synchronization mechanism 100. As a notification of completion of the second layer barrier synchronization is delivered from the hardware barrier synchronization mechanism 100, every child thread is notified of completion of the barrier synchronization in the step S49.

Specifically, in the example of FIG. 11, the primary cache L1-0 is used for synchronization of the parent thread Th0 and the child thread Th1 in the processor core cpu0, and the primary cache L1-1 is used for synchronization of the parent thread Th2 and the child thread Th3 in the processor core cpu1.

The hardware barrier synchronization mechanism 100 is used for barrier synchronization between the parent threads Th0 and Th2 of the processor cores cpu0 and cpu1.

In short, the primary cache L1 is used for barrier synchronization of plural threads in a processor core which cannot be controlled by the hardware barrier synchronization mechanism 100 while the hardware barrier synchronization mechanism 100, which is capable of high-speed processing, is used for barrier synchronization between processor cores. Barrier synchronization in multithread parallel processing is thus made possible.

Figure 13:
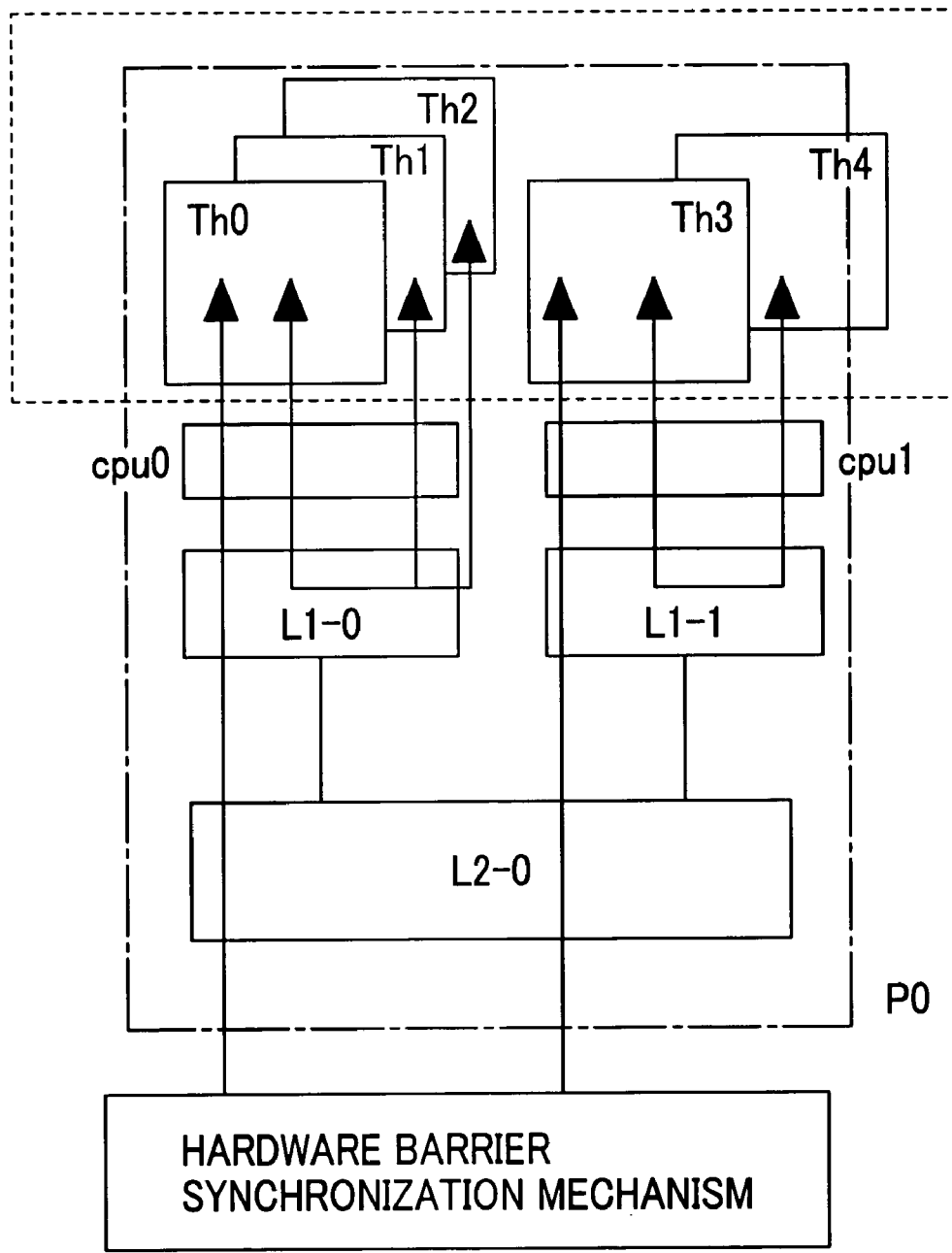
FIG. 13 is an explanatory diagram showing the hierarchical structure of a synchronization group when the thread count differs from one processor core to another.

FIG. 13 shows an example in which a thread to be synchronized is added to the synchronization groups of FIG. 11 and one processor module P0 handles barrier synchronization of five threads.

In the initial setting of FIG. 7, when M is an aliquant part of N, remainder threads are allocated one at a time in ascending order of processor core number. In the case where M=2 and N=5, the processor core cpu0 which has a smaller processor core number is assigned three threads Th0 to Th2, and the processor core cpu1 having a larger processor core number is assigned two threads Th3 and Th4 as shown in FIG. 13.

Figure 14:
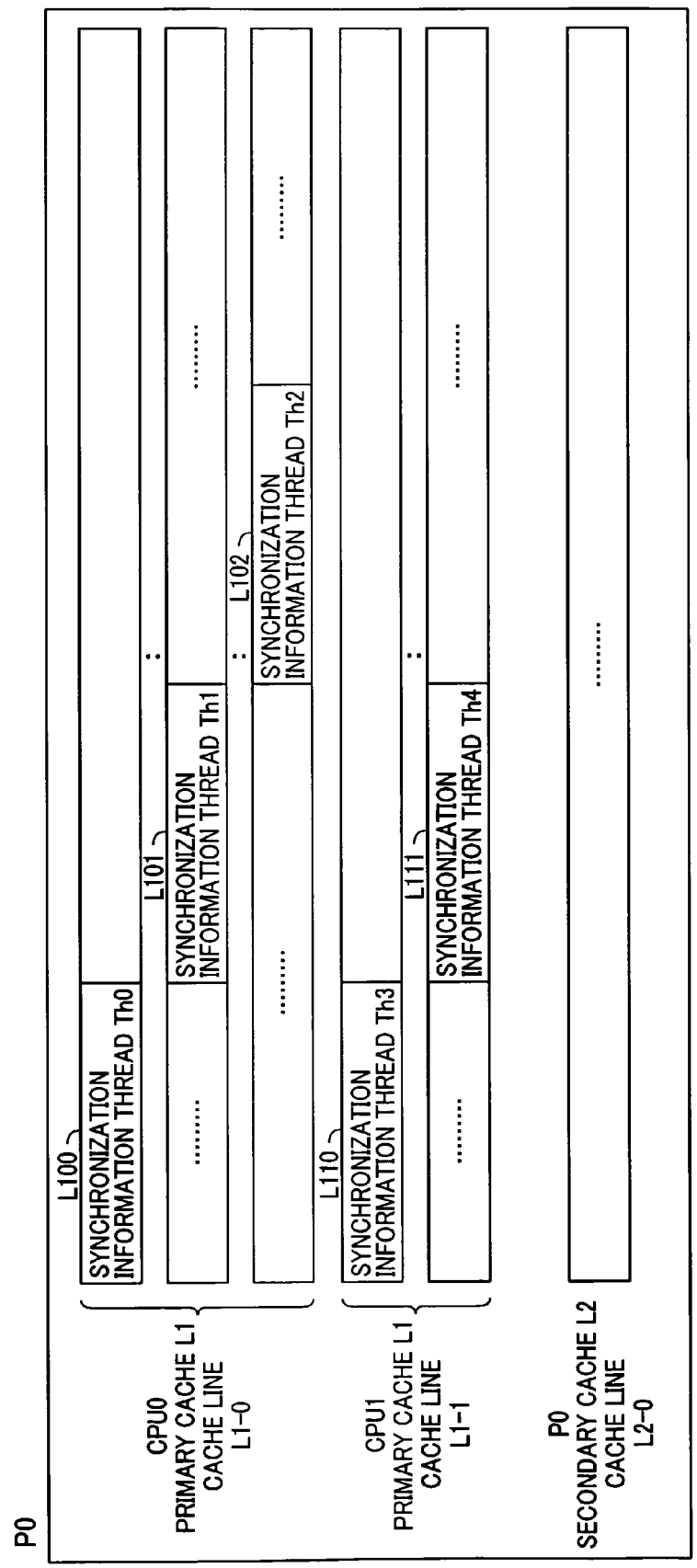
FIG. 14 is an explanatory diagram showing an example of how a shared area for data storage is set when the thread count differs from one processor core to another.

Then the three threads, Th0 to Th2, form a first layer synchronization group of the processor core cpu0, with the thread Th0 serving as a parent thread and the threads Th1 and Th2 serving as child threads. As storage areas for barrier synchronization, the storage area L100 that stores synchronization information of the thread Th0, the storage area L101 that stores synchronization information of the thread Th1, and the storage area L102 that stores synchronization information of the thread Th2 are set in the primary cache L1-0 of the processor core cpu0 as shown in FIG. 14.

The barrier synchronization processing of FIG. 13 is similar to that of FIG. 12. Having reached a barrier synchronization point, the parent thread Th0 monitors the storage areas L101 and L102 in the primary cache L1-0 and waits until a synchronization point ID that matches the synchronization point ID of the parent thread Th0 is written in the storage areas L101 and L102 of the child threads Th1 and Th2. At the time when the synchronization point IDs in the storage areas L100 to L102 become a match, barrier synchronization is completed for the first layer synchronization group of the processor core cpu0, and the parent thread Th0 notifies the hardware barrier synchronization mechanism 100 of completion of the synchronization. Detecting that barrier synchronization between the parent threads Th0 and Th3 of the respective processor cores cpu0 and cpu1 is completed, the hardware barrier synchronization mechanism 100 notifies the parent threads Th0 and Th3 of completion. This completes barrier synchronization in every layer.

Thus, the present invention is also applicable to a case in which the assigned thread count varies from one processor core to another. By using the storage areas L100 to L102 of the primary cache L1 in barrier synchronization, barrier synchronization can be performed on an arbitrary count of threads.

The first embodiment described above shows an example in which a processor module is connected to the main memory MM via a controller. Alternatively, a memory controller may be provided in a processor core or in a processor module and connected to the main memory MM (not shown).

Second Embodiment

FIGS. 15 to 20 illustrate a second embodiment of this invention in which software alone is used in barrier synchronization without the help of the hardware barrier synchronization mechanism 100 shown in the first embodiment.

Figure 15:
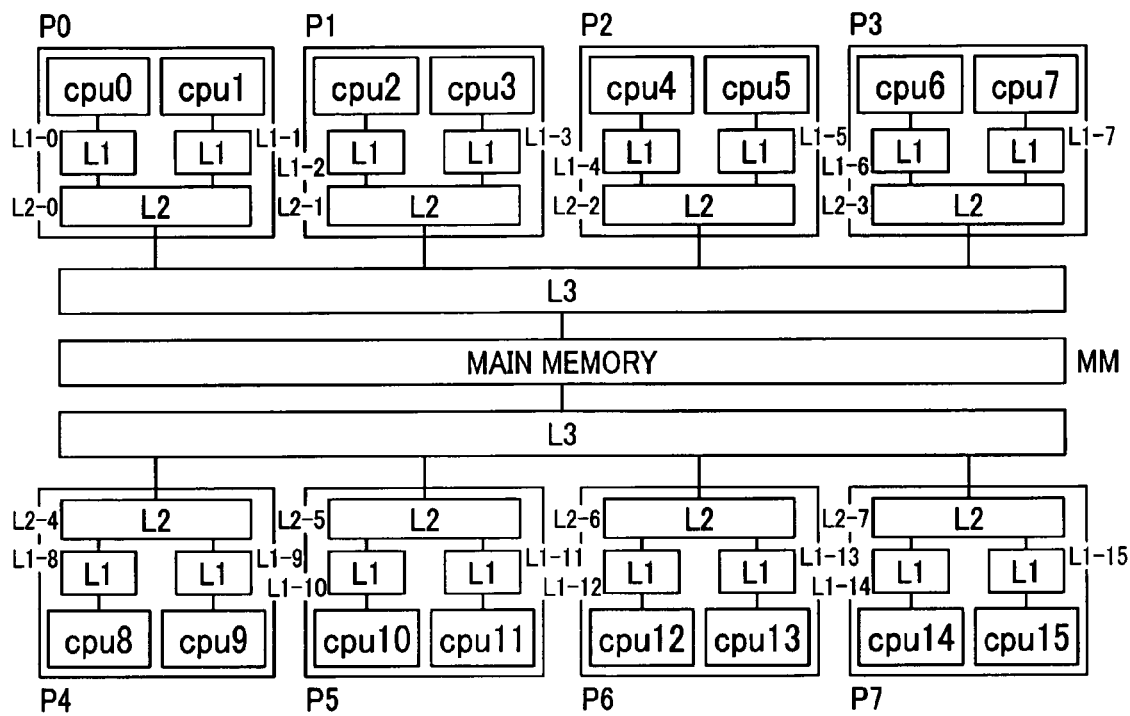
FIG. 15 is a configuration diagram showing a parallel computer that uses software alone to perform barrier synchronization processing according to a second embodiment of this invention.

FIG. 15 shows the hardware configuration of a parallel computer according to the second embodiment. The parallel computer of this embodiment is obtained by removing the hardware barrier synchronization mechanism 100 from the parallel computer of the first embodiment shown in FIG. 1, and the rest of the configuration is the same as in the first embodiment.

Figure 16:
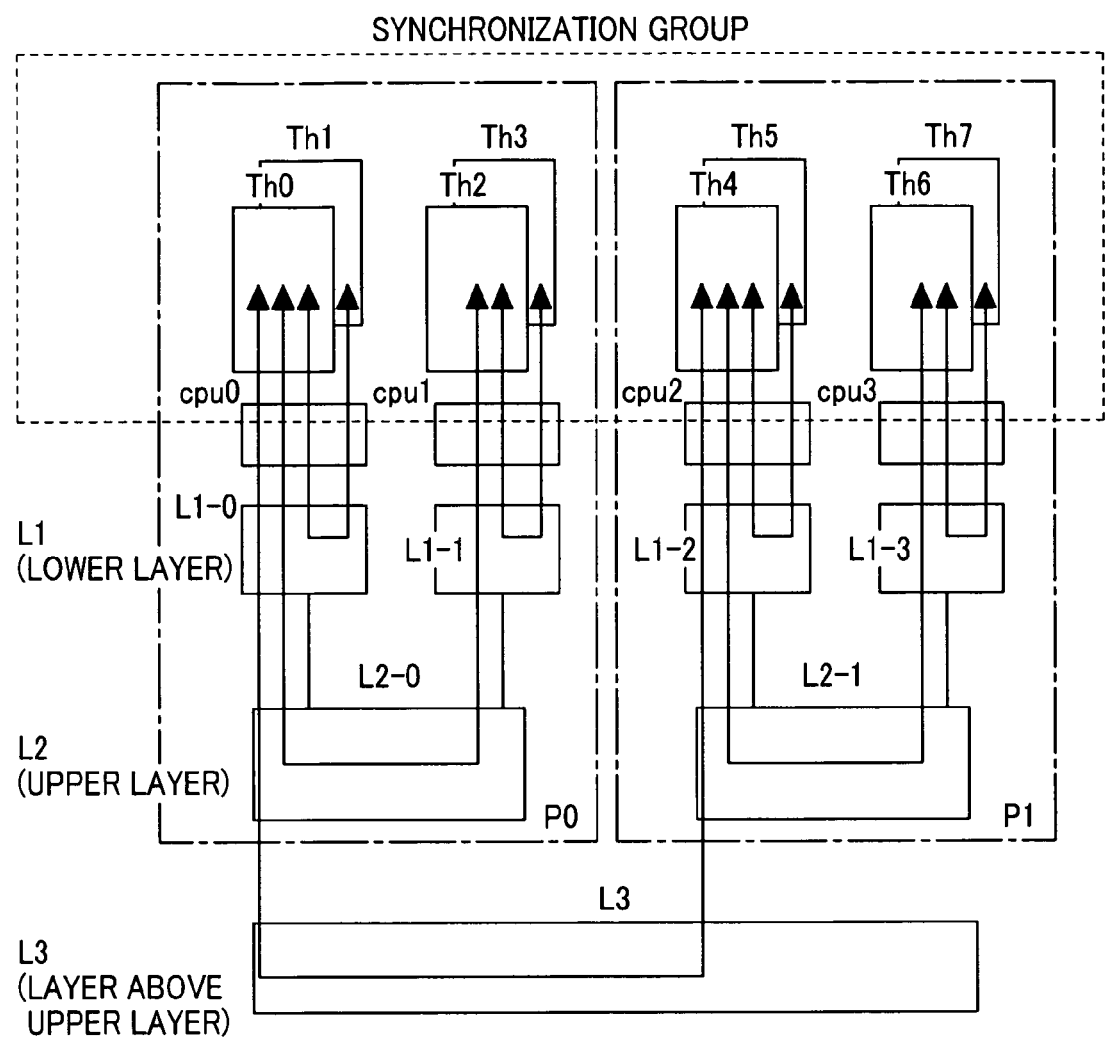
FIG. 16 is an explanatory diagram showing the hierarchical structure of a synchronization group on which barrier synchronization processing is performed by four processor cores according to the second embodiment.

FIG. 16 shows an example of the synchronization group Gr. FIG. 16 is similar to FIG. 4 referred to in the first embodiment in that the drawing shows details of the synchronization group Gr for when four processor cores cpu0 to cpu3 are assigned eight threads Th0 to Th7 to receive barrier synchronization.

The first layer, which is the lowermost layer of the synchronization group Gr, makes a first synchronization group in which threads on the same processor core are synchronized with each other through barrier synchronization. The primary cache L1 which can be shared among threads on the same processor core are used as a shared area for data storage, and the threads are synchronized by writing their respective synchronization information in the primary cache L1.

The second layer which is the upper layer is a second synchronization group in which processor cores in the same processor module are synchronized with each other through barrier synchronization of threads. The secondary cache L2 that can be shared between the processor cores in the same processor module serves as a shared area for data storage. One thread out of threads assigned to each processor core is chosen as a parent thread, and the parent thread of each processor core writes synchronization information in the secondary cache L2 to synchronize the parent threads with each other.

Next, the third layer (uppermost layer) makes a third synchronization group in which threads of different processor modules are synchronized with each other through barrier synchronization. One of parent threads on the same processor module is chosen as the parent thread of the processor module, and the parent thread of one processor module is synchronized with the parent thread of another processor module. The tertiary cache L3 which can be shared among processor modules are used as a shared area for data storage. One thread chosen out of parent threads of the same processor module serves as the representative parent thread of the processor module, and the representative parent thread of each processor module writes synchronization information in the tertiary cache L3. The representative parent threads are thus synchronized with each other.

In short, while the second embodiment is the same as the first embodiment in terms of barrier synchronization of the first layer and the second layer, it differs from the first embodiment in that, in the third layer barrier synchronization, parent threads each representing different processor modules are synchronized with each other with the use of the tertiary cache L3.

Each thread constituting a synchronization group is assigned a thread number as an identifier that is unique throughout the synchronization group Gr. A thread that has the smallest thread number in the same layer is chosen as a parent thread, and remaining threads of the layer serve as child threads.

In the first and second layers, the threads Th0, Th2, Th4 and Th6 serve as the parent threads of the processor cores cpu0, cpu1, cpu2 and cpu3, respectively, as in the first embodiment. In the third layer, the thread Th0, which has the smallest thread number in the processor module P0, serves as the parent thread of the processor module P0, and the thread Th4, which has the smallest thread number in the processor module P1, servers as the parent thread of the processor module P1.

Figure 17:
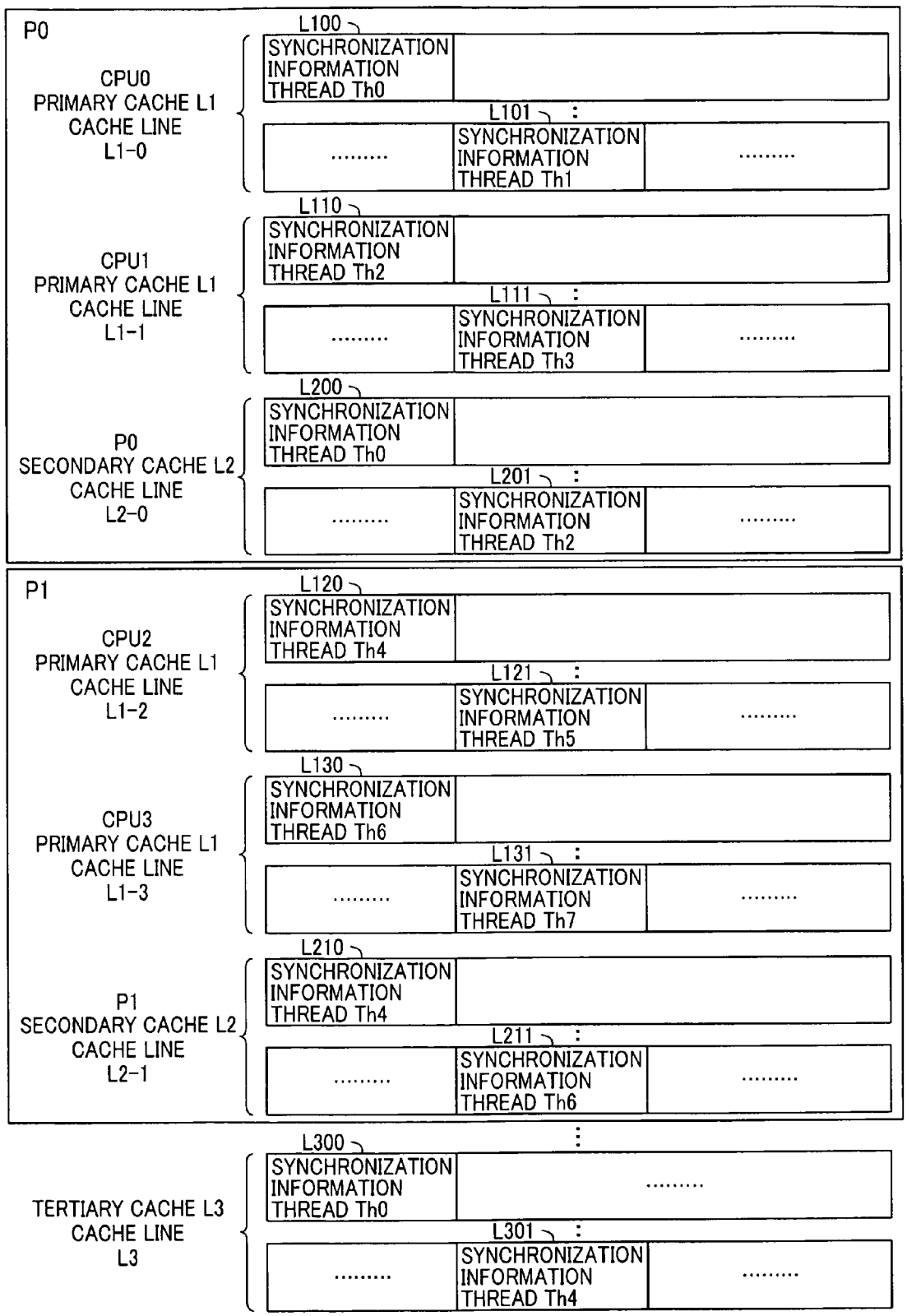
FIG. 17 is an explanatory diagram showing an example of how a shared area for data storage is set for each processor module and how a tertiary cache memory is set according to the second embodiment.

Similarly to the first embodiment, as shown in FIG. 17, the storage areas L100 to L131 in which threads of the first layer to be synchronized write synchronization information are set in the primary cache L1. As in the first embodiment, the storage areas L200 to L211 in which parent threads of the second layer write synchronization information are set in the secondary cache L2.

For the third layer barrier synchronization in which the parent threads Th0 and Th4 respectively representing the processor modules P0 and P1 are synchronized with each other, a storage area L300 that stores synchronization information of the parent thread Th0 and a storage area L301 that stores synchronization information of the parent thread Th4 are set, as shown in FIG. 17, in the tertiary cache L3, which is a shared area for data storage sharable between the processor modules P0 and P1.

To synchronize multiple processor modules through barrier synchronization, a storage area is set in the tertiary cache L3 for each parent thread that represents a processor module, and barrier synchronization is performed in the manner described above. Alternatively, a fourth layer synchronization group may be provided and the main memory MM may be used as a shared area for data storage that is shared between processor modules of the fourth layer. In this case, a storage area is set in the main memory MM for each representative parent thread in order to store synchronization information of the representative parent thread.

FIGS. 18 to 21 are flow charts for a program (load module) executed in the synchronization group Gr of the processor modules P0 and P1.

Figure 18:
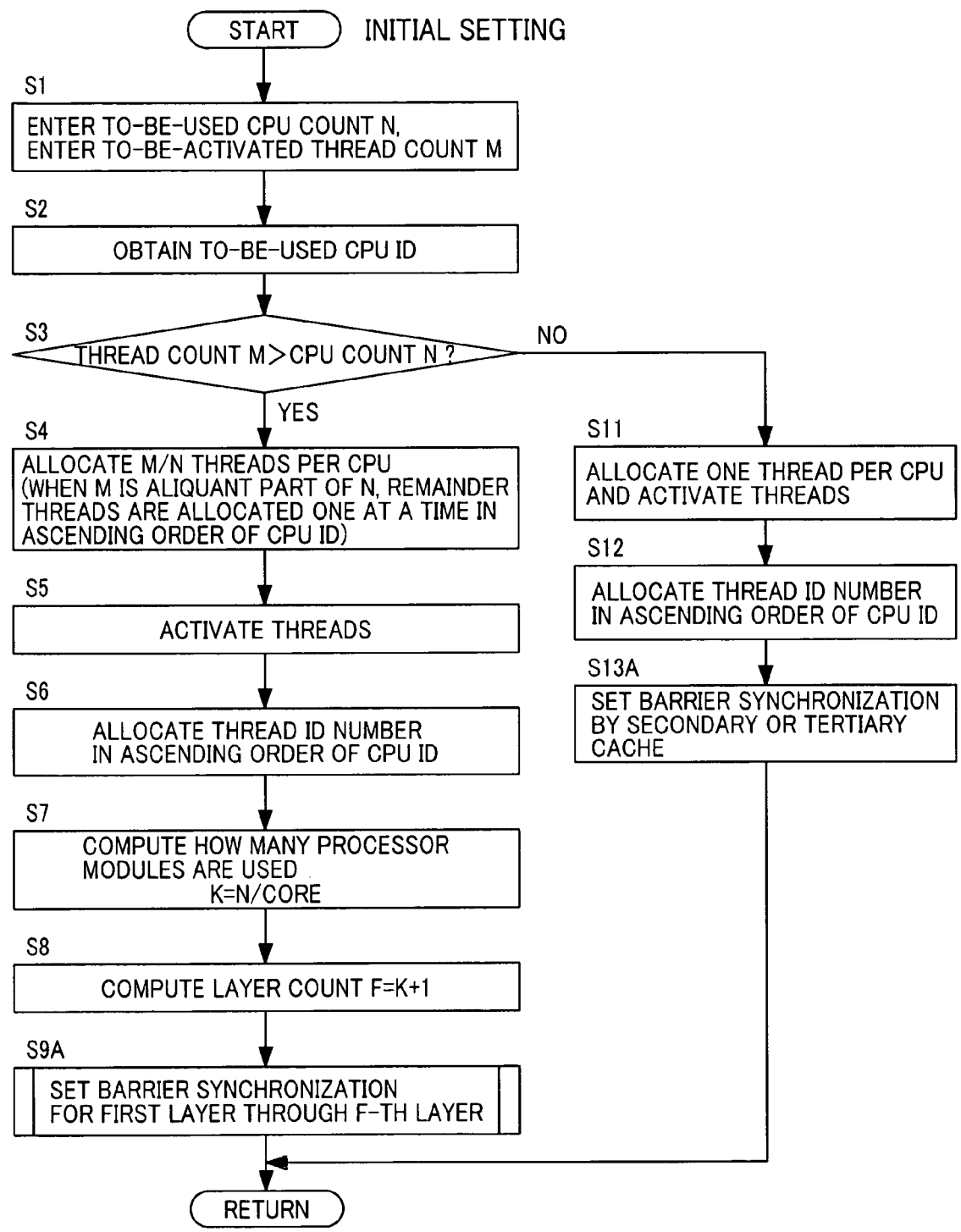
FIG. 18 is a flow chart for initial setting of barrier synchronization processing according to the second embodiment.
Figure 19:
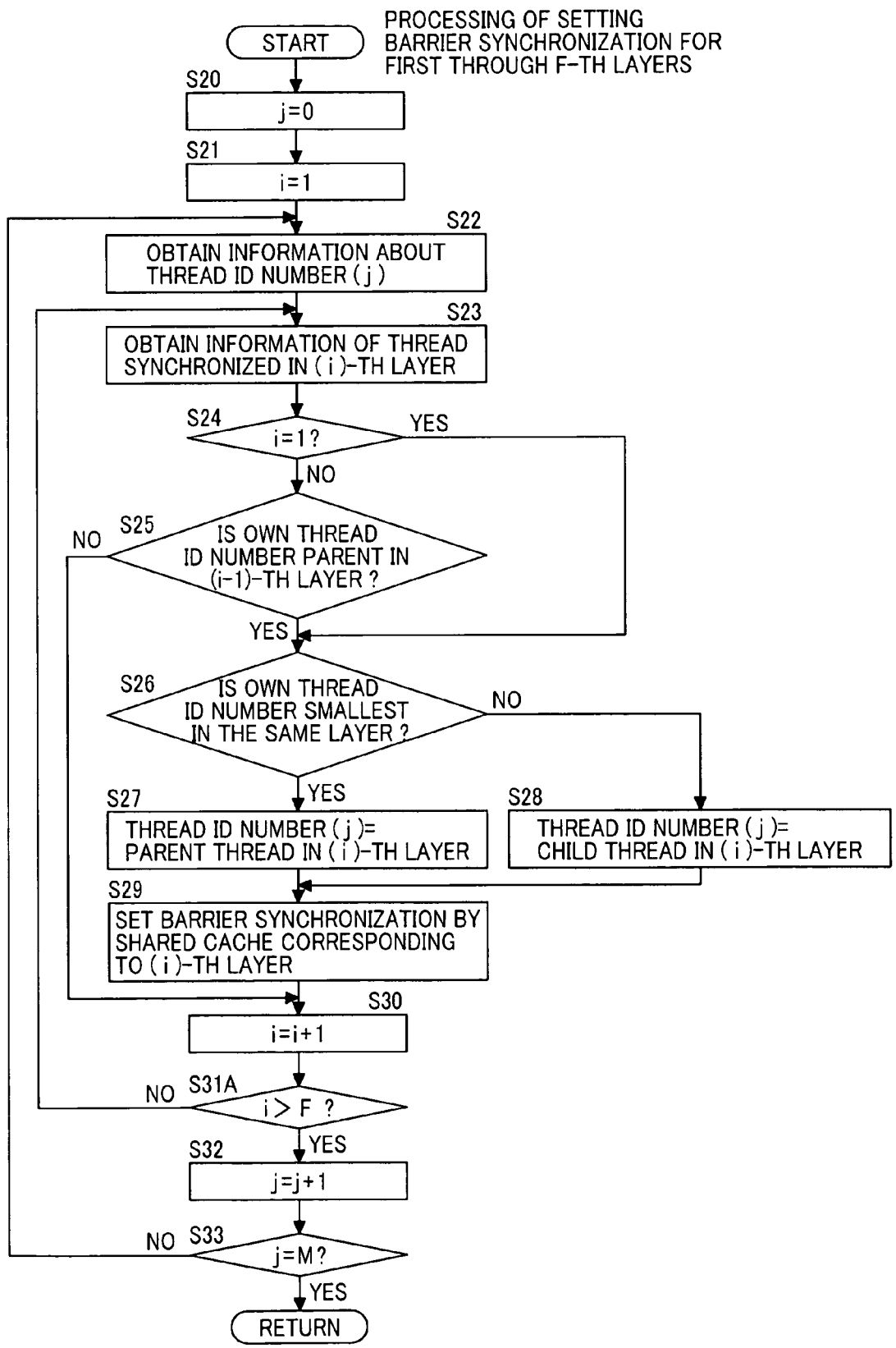
FIG. 19 is a flow chart for initial setting of barrier synchronization processing for first and F-th layers according to the second embodiment.
Figure 20:
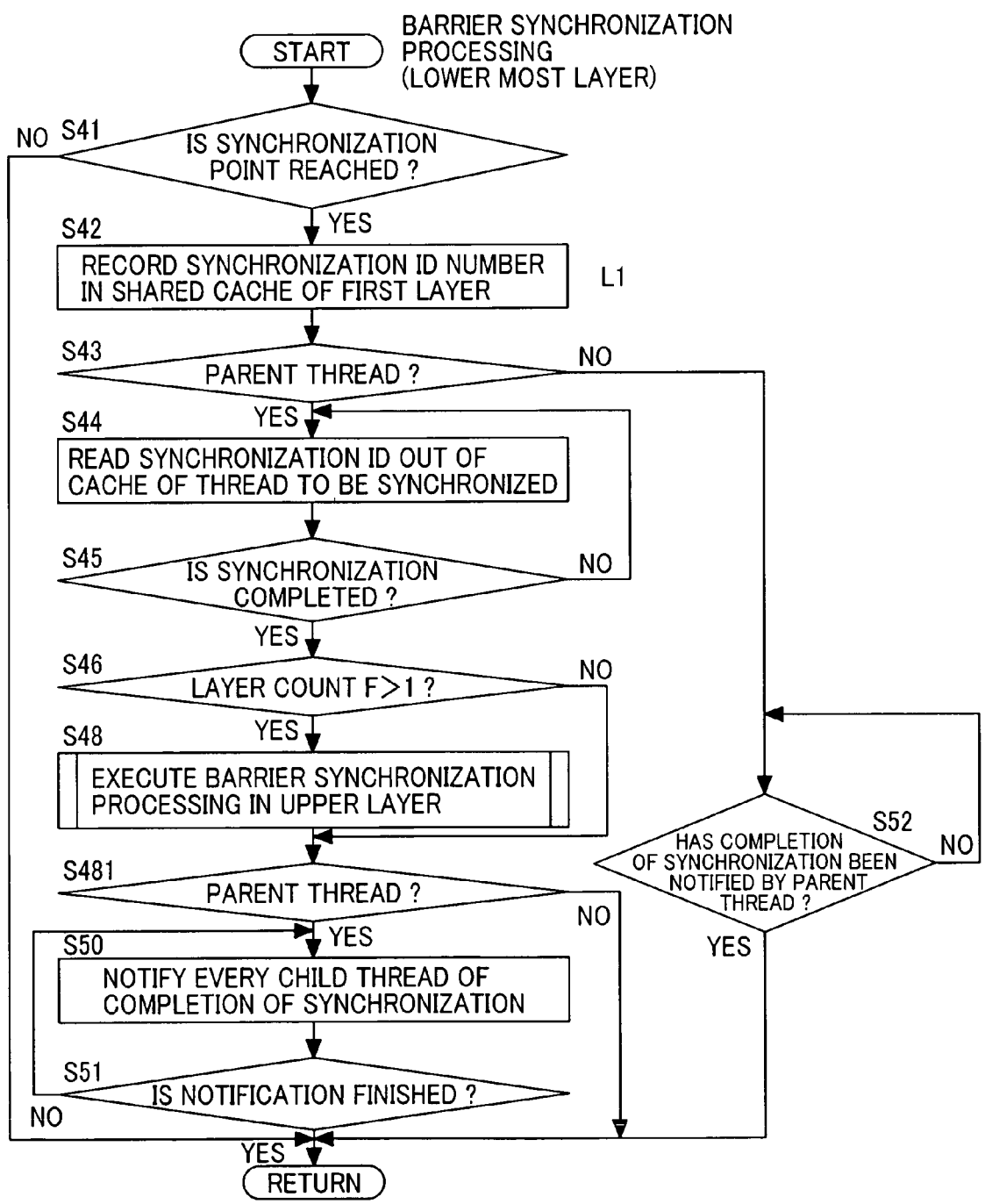
FIG. 20 is a flow chart for barrier synchronization processing showing main routine processing according to the second embodiment.
Figure 21:
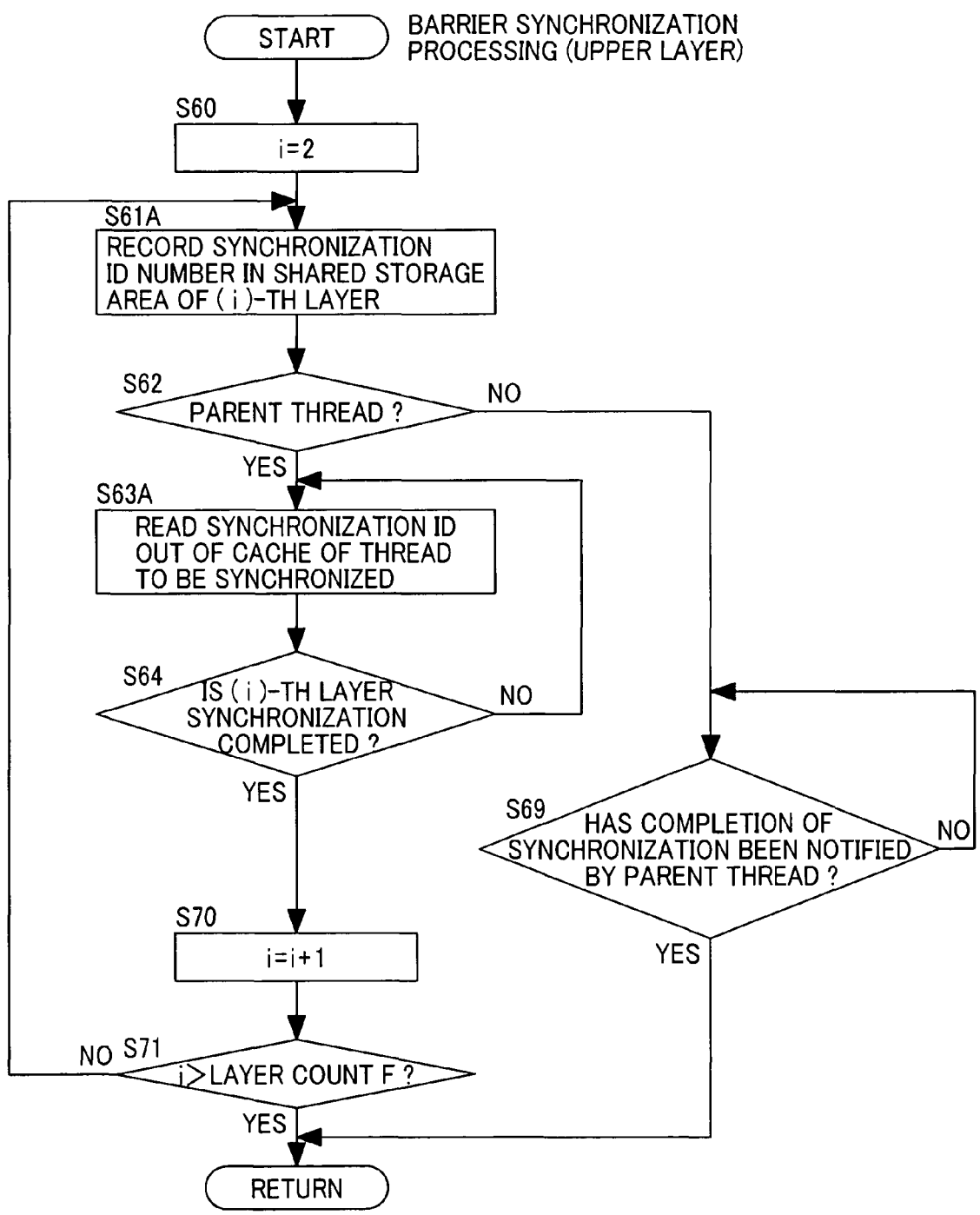
FIG. 21 is a flow chart for upper layer barrier synchronization processing according to the second embodiment.

FIGS. 18 and 19 show the initial setting processing PG1, which is described in the first embodiment with reference to FIG. 6. FIGS. 20 and 21 show the barrier synchronization processing in the computation program PG2, which is a part of the program PG shown in FIG. 6.

FIG. 18 shows how the initial setting processing PG1 sets initial settings of the lowermost layer (first layer). The steps S1 through S8, S11, and S12 of FIG. 18 are the same as those of FIG. 7 in the first embodiment. According to the processor core (CPU) count N and to-be-activated thread count M entered, threads are assigned in ascending order of processor core number, thread numbers are assigned to the threads, and the threads are activated. In the case of multithread parallel processing, the layer count F of the synchronization group is obtained from the count CORE of processor cores per processor module and from the to-be-used processor core count N. In a step 9A, barrier synchronization settings are set for the first layer to the F-th layer as shown in FIG. 19.

In the case where in the step S3, the processing is judged as single thread processing, one thread is assigned to one processor core in the steps S11 and S12 as in the first embodiment. In a step S13A, shared area for data storages for barrier synchronization are set in a number determined by the to-be-used processor core count. For instance, a storage area that stores synchronization information is set in the secondary cache L2 for barrier synchronization performed on threads in one processor module, and a storage area is set in the tertiary cache L3 for barrier synchronization between processor modules.

FIG. 19 shows a loop repeated as many times as the layer count to set barrier synchronization settings for the first layer to the F-th layer. FIG. 19 is the same as FIG. 8 referred to in the first embodiment except a step S31A. In the step S31A, the next thread is set when the variable i exceeds the uppermost layer (F-th layer).

Whereas the first embodiment uses the hardware barrier synchronization mechanism 100 in barrier synchronization of the uppermost layer, the second embodiment sets, as mentioned above, a storage area in the tertiary cache L3 or the main memory MM for each parent thread representing a processor module, and uses the thus set storage area in processing of barrier synchronization between processor modules.

Next, the barrier synchronization processing of FIGS. 20 and 21 is described.

FIG. 20 is similar to FIG. 9 referred to in the first embodiment, and shows processing performed on the first layer synchronization group. In the case where the computation processing has already reached a given synchronization point in the step S41, the program proceeds to the barrier synchronization processing of the step S42 and subsequent steps. In the case where the synchronization point has not been reached, the computation processing is continued.

In the step S42 where the synchronization point has already been reached, the ID of the synchronization point is written in a given storage area of the primary cache L1, which is a shared area for data storage of the first layer.

In the step S43, whether or not the own thread is a parent thread is judged. When the thread is a parent thread, the program proceeds to processing of the step S44. When the thread is a child thread, the program proceeds to the step S52 and waits for a barrier synchronization completion notification from the parent thread. Upon reception of the notification, the synchronization processing is ended to start the next computation processing.

In the step S44 where the current thread is a parent thread, the synchronization point ID of a child thread in the same first layer is read out of a given cache line in the primary cache L1. In the step S45, whether or not the synchronization point ID of the parent thread matches the synchronization point ID of every child thread is checked. When it is a match, the program judges that the barrier synchronization is completed, and proceeds to the step S46. When it is not a match, the program waits until the synchronization point ID of every child thread matches the synchronization point ID of the parent thread.

In the step S46, the program judges whether or not the synchronization group layer count F obtained in the step S8 of FIG. 18 is larger than 1, in other words, whether or not there is a layer above the first layer. When there is an upper layer, the program proceeds to the step S48 to perform upper layer barrier synchronization processing shown in FIG. 21. When there is no other layer than the first layer, the program proceeds to a step S481.

In the upper layer barrier synchronization processing of the step S48, as barrier synchronization is completed for synchronization groups of all the layers, the sub-routine of FIG. 21 is ended and the program moves on to processing of the step S481.

In the step S481 where barrier synchronization has already been completed in every layer, whether or not the own thread serves as a parent thread in any of the layers is judged. When the thread is a parent thread, the program proceeds to the step S50 to notify every child thread of completion of the synchronization. In the step S51, once the child threads are all notified, the barrier synchronization processing is ended to start the next computation processing. When the current thread is judged as a child thread in the step S481, the synchronization completion notification from the parent thread has already been received in the upper layer barrier synchronization processing of FIG. 21, and therefore the barrier synchronization processing is ended to start the next computation processing.

Described next is the upper layer (from the second layer to the F-th layer) barrier synchronization processing of FIG. 21.

The processing of FIG. 21 is executed after barrier synchronization of the first layer is completed. First, in a step S60, the variable i indicating which layer is processed is set to 2, to thereby designate the second layer as the layer that receives barrier synchronization processing next.

In a step S61A, since the own thread has already reached a synchronization point, the thread writes its synchronization point ID in a given storage area of the secondary cache L2, which is a shared area for data storage used by the i-th layer.

In the step S62, which thread is a parent thread and which thread is a child thread is judged. In the case where the current thread is a parent thread, the program proceeds to a step S63A and performs barrier synchronization on the synchronization group of the current layer (i-th layer). In the case where the current thread is a child thread of the i-th layer, the program proceeds to the step S69 to wait for a synchronization completion notification from the parent thread.

In the step S63A where the current thread is a parent thread, a shared area for data storage that is used by the synchronization group of the current layer (i-th layer) is consulted. Through the shared area for data storage of the current layer, the parent thread monitors a synchronization point ID stored in a storage area of a child thread to be synchronized. At the time when the synchronization point ID of every child thread becomes a match, it is judged that the i-th layer synchronization is completed (S63A and S64).

In the step S70, 1 is added to the variable i indicating which layer is processed in order to perform barrier synchronization processing on the next upper layer. In a step S71, the program judges whether or not barrier synchronization processing is completed from the lowermost layer through the uppermost layer. In the case where the value of the variable i after the increment exceeds the layer count F obtained in the step S8 of FIG. 18, it is judged that all the layers up through the uppermost layer has finished barrier synchronization through the processing of the steps S60 through S64. In the case where the uppermost layer has not been reached yet, the program returns to the step S61A to perform barrier synchronization processing on a still upper layer ((i+1)-th layer).

When the variable i is larger than the layer count F in the step S71, it means that synchronization processing is finished for every layer and the program returns to the processing of FIG. 20 and proceeds to the step S481. In the step S481, when the current thread serves as a parent thread in any of the layers, every child thread is notified of completion of the barrier synchronization processing.

In the example of FIG. 16, the above processing is performed as follows:

In FIG. 16, to perform the above barrier synchronization processing on the thread Th0 of the processor core cpu0, first, the thread Th0 is chosen as a parent thread of the first layer in the initial setting processing of FIGS. 18 and 19 since the thread Th0 has the smallest thread number in the processor core cpu0.

Similarly, the processor cores cpu1 to cpu3 choose the threads Th2, Th4 and Th6, respectively, as parent threads of the first layer.

Next, the thread number of the thread Th0 is compared against the thread numbers of the threads Th2 and Th3 of the other processor core cpu1 in the same processor module P0. Having the smallest thread number of the three, the thread Th0 serves as a parent thread of the second layer. The thread Th2 of the processor core cpu1 serves as a child thread of the second layer. Similarly, in the processor module P1, the thread Th4 serves as a parent thread of the second layer whereas the thread Th6 serves as a child thread of the second layer.

Next, the thread number of the thread Th0 is then compared against the thread numbers of the threads Th4 to Th7 in the other processor module P1. Having the smallest thread number, the thread Th0 serves as a parent thread of the third layer. The thread Th4 in the processor module P1 serves as a child thread of the third layer.

In the barrier synchronization processing of FIG. 20, the thread Th0 reaches a synchronization point and writes the ID of the synchronization point in the storage area L100 of the primary cache L1-0 shown in FIG. 17. The thread Th0 then waits for the arrival of the child thread Th1 of the first layer at the same synchronization point. Reaching the synchronization point, the child thread Th1 waits until barrier synchronization is completed for every layer in the step S52 of FIG. 20.

Meanwhile, the parent thread Th0 advances to the step S48 after the first layer barrier synchronization processing is completed. In the step S48, since the layer count F of this synchronization group is 3, the program proceeds to the upper layer barrier synchronization processing of FIG. 21. In FIG. 21, the variable i is set to 2 to start the barrier synchronization processing of the second layer.

In the second layer, the thread Th0 writes a synchronization point ID in the storage area L200 of the secondary cache L2-0 shown in FIG. 17. Being a parent thread of the second layer, the thread Th0 then waits for the child thread Th2 to reach the synchronization point. The child thread Th2 reaches the synchronization point and waits until barrier synchronization is completed for every layer in the step S69 of FIG. 21.

Meanwhile, the parent thread Th0 moves to the step S70 after the second layer barrier synchronization processing is completed. In the step S70, the variable i is incremented and, when the uppermost layer has not been reached yet, the program returns to the step S61A to start barrier synchronization processing of the third layer.

In the third layer, the thread Th0 writes a synchronization point ID in the storage area L300 of the tertiary cache L3 shown in FIG. 17. Being a parent thread of the third layer, the thread Th0 then waits for the child thread Th4 to reach the synchronization point. The child thread Th4 reaches the synchronization point and waits until barrier synchronization is completed for every layer in the step S69 of FIG. 21.

Meanwhile, the parent thread Th0 moves to the step S70 after the third layer barrier synchronization processing is completed. When increment of the variable i in the step S70 makes the variable i larger than the layer count F, it means that barrier synchronization processing has been completed for the uppermost layer. Accordingly, the program moves to the step S481 of FIG. 20.

Being a parent thread in each of the three layers, the thread Th0 notifies its child threads Th4, Th2 and Th1 of completion of synchronization in the order stated.

Receiving the synchronization completion notification from the parent thread Th0, the child thread Th1 of the first layer leaves the stand-by state in the step S52 and starts the next computation processing.

The child thread Th2 of the second layer that has been in a stand-by state in the step S69 of the second layer barrier synchronization processing receives the synchronization completion notification from the parent thread Th0. Then, being judged in the step S481 of FIG. 20 as a parent thread of the processor core cpu1 in the first layer, the thread Th2 notifies, in the step S50, the child thread Th3 of completion of the synchronization, before resuming the next computation processing.

The child thread Th4 of the third layer that has been in a stand-by state in the step S69 of the third layer barrier synchronization processing receives the synchronization completion notification from the parent thread Th0. Then, being judged in the step S481 of FIG. 20 as a parent thread of the processor module P1 in the third layer, the thread Th4 notifies, in the step S50, the child threads Th6 and Th5 of completion of the synchronization in the order stated, before resuming the next computation processing.

The parent thread Th2 of the processor core cpu1 in the first layer notifies, in the steps S481 and S50, the child thread Th3 in the first layer of completion of the synchronization in the manner described above. Similarly, the parent thread Th4 of the processor module P1 sends a synchronization completion notification to the child threads Th6 and Th5 of the first layer in the order stated. The parent thread Th6 of the first layer sends a synchronization completion notification to the child thread Th7. As parent threads of the respective layers thus notify their child threads of completion of synchronization, barrier synchronization processing is finished for threads in every layer.

Thus, without the hardware barrier synchronization mechanism 100, barrier synchronization of threads on the same processor core uses a shared area for data storage that is closest to the processor core (the primary cache L1), a shared area for data storage that is second-closest to the processor core (the secondary cache L2) is used for barrier synchronization between processor cores of the same processor module, and a shared area for data storage that is third-closest to the processor core (the tertiary cache L3) is used for barrier synchronization between processor modules.

As has been described, synchronization groups hierarchized from shared area for data storages close to processor cores toward the main memories MM are set in a processor core, in a processor module, and across processor modules, and barrier synchronization processing is performed on each of the synchronization groups. This ensures that synchronization of multiple threads is achieved successfully in a type of multithread parallel processing that employs a multicore microprocessor to assign plural threads to one processor core. In addition, since the second embodiment does not need a hardware barrier synchronization mechanism, the second embodiment can build a parallel computer at low cost and enables any computer with a multicore microprocessor to perform parallel processing.

Third Embodiment

Figure 22:
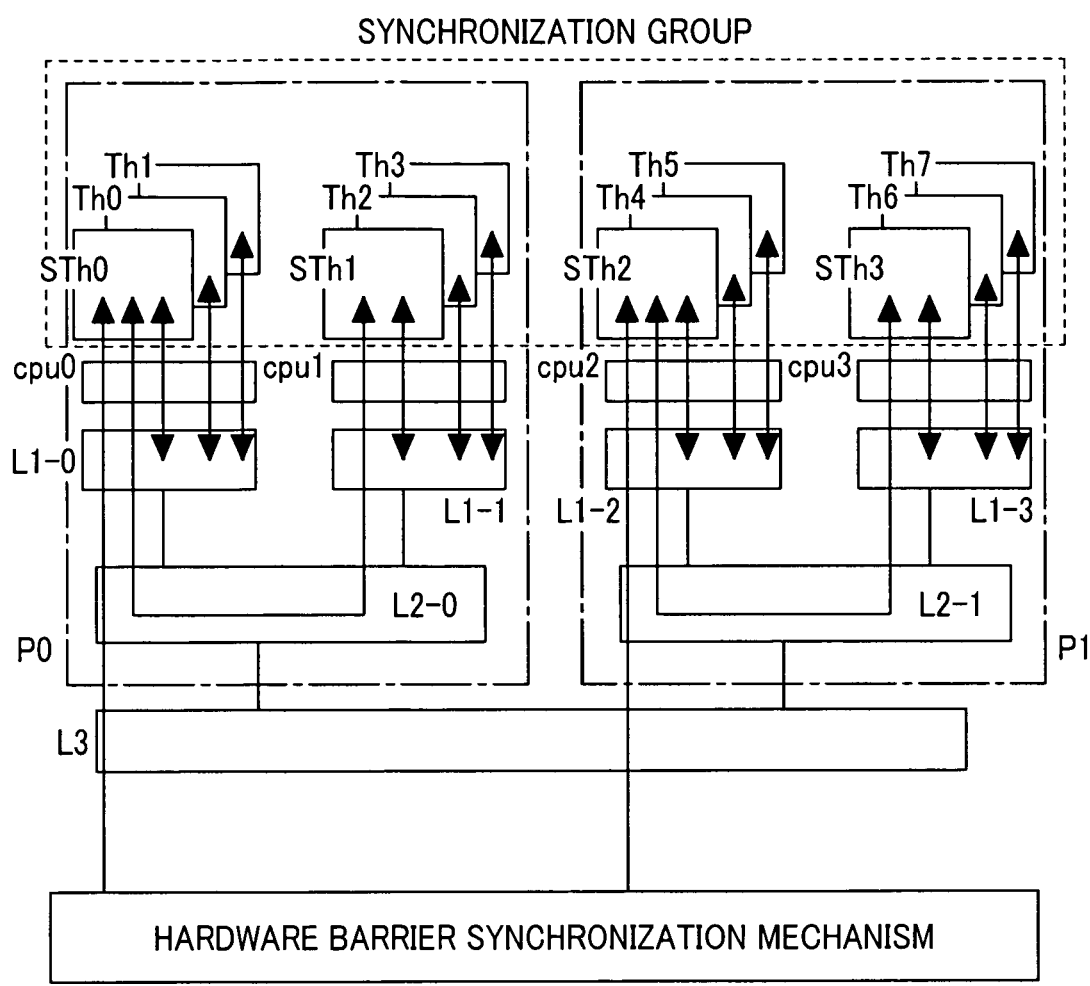
FIG. 22 is an explanatory diagram showing the hierarchical structure of a synchronization group on which barrier synchronization processing is performed by four processor cores with the use of a synchronization thread according to a third embodiment of this invention.

FIGS. 22 and 23 show a third embodiment in which the barrier synchronization processing described in the first embodiment is carried out by dedicated threads while other threads are dedicated to parallel computation processing. The rest of the configuration of the third embodiment is the same as the first embodiment.

The processor cores cpu0 to cpu3 are assigned and execute threads Th0 to Th7, which perform computation processing alone and function as child threads, and synchronization threads Sth0 to Sth3, which function as parent threads in each layer and perform barrier synchronization processing alone. The synchronization threads Sth0 to Sth3 execute only the barrier synchronization processing in the computation processing PG2 of the program PG shown in FIG. 6. The computation threads Th0 to Th7 execute computation processing (parallel computation processing) of the program PG and only a part of barrier synchronization processing.

The computation threads Th0 to Th7 all function as child threads in barrier synchronization processing and, upon reaching a synchronization point, perform only processing of writing the ID of the synchronization point in the shared area for data storage of the first layer (the primary cache L1). After writing the synchronization point ID in the shared area for data storage, the computation threads wait for a synchronization completion notification from the synchronization threads STh1 to STh3 in the step S52 of FIG. 9.

On the other hand, the synchronization threads STh0 to Sth3 function as parent threads in each layer of a synchronization group, does not perform computation processing (parallel computation processing), and only work to synchronize the computation threads through barrier synchronization. The processor cores cpu0 to cpu3 are assigned the synchronization threads STh0 to STh3, respectively. The synchronization thread STh0 of the processor core cpu0 constitutes a first layer synchronization group in which the computation threads Th0 to Th1 are synchronized through barrier synchronization.

The synchronization threads STh0 and STh1 of the processor cores cpu0 and cpu1 constitute a second layer synchronization group in which processor cores are synchronized with each other through barrier synchronization. For barrier synchronization of the processor modules P0 and P1, the synchronization threads STh0 and STh2 are synchronized with each other by using the hardware barrier synchronization mechanism 100.

In this fashion, the synchronization threads STh1 to STh3 of the processor cores cpu1 to cpu3 constitute a first layer synchronization group and a second layer synchronization group.

The synchronization threads STh0 to STh3 and the computation threads Th0 to Th7 share storage areas as shown in FIG. 23.

Cache lines are set in the primary caches L1-0 to L1-3 of the processor cores cpu0 to cpu3 as in the first embodiment, and store synchronization point IDs of the synchronization threads STh0 to STh3 and of the computation threads Th0 to Th7.

The storage areas L200 to L211 set in the secondary cache L2 of the processor modules P0 and P1 store synchronization information of the synchronization threads STh0 to STh3 instead of parent threads of the first embodiment.

In the processor core cpu0, for example, synchronization point IDs of the computation threads Th0 and Th1 are written in the storage areas L100 and L101 and, when the two synchronization point IDs match, the synchronization thread STh0 stores the synchronization point ID of the storage area L100 in the storage area L200, which is set in the secondary cache L2. Similarly, the synchronization thread STh1 of the processor core cpu1 stores a synchronization point ID of the storage area L110 in the storage area L201, which is set in the secondary cache L2, after barrier synchronization of the computation threads Th2 and Th3 is completed.

When information in the storage area L200 of the secondary cache L2 matches information in the storage area L201, the synchronization thread STh0 judges that barrier synchronization of the second layer has been completed, and notifies the hardware barrier synchronization mechanism 100 of completion of the synchronization.

The synchronization threads STh0 to STh3 execute the processing of a parent thread described in the first embodiment with reference to FIG. 9 and the processing of FIG. 10. The computation threads Th0 to Th7, on the other hand, execute only the steps S41 to S43 and the step S52 of FIG. 9.

Thus dividing the threads of the first embodiment into computation threads, which mainly perform computation processing, and synchronization threads, which perform barrier synchronization processing alone, eliminates the need for processing of setting and judging a parent-child thread relation unlike the first embodiment. Therefore, barrier synchronization according to the third embodiment requires smaller computation load.

Fourth Embodiment

Figure 24:
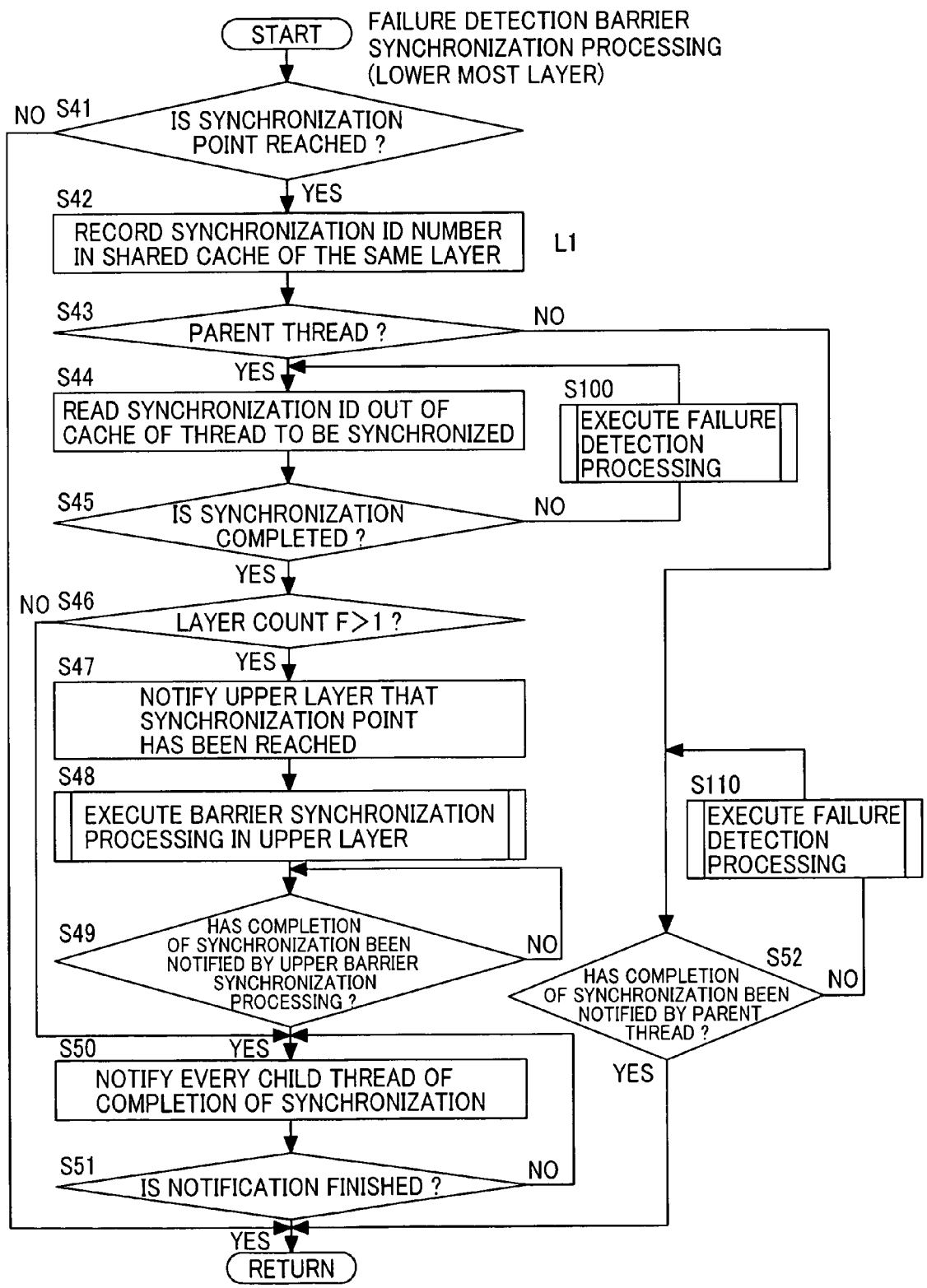
FIG. 24 is a flow chart for lowermost layer barrier synchronization processing that includes failure detection processing according to a fourth embodiment of this invention.
Figure 25:
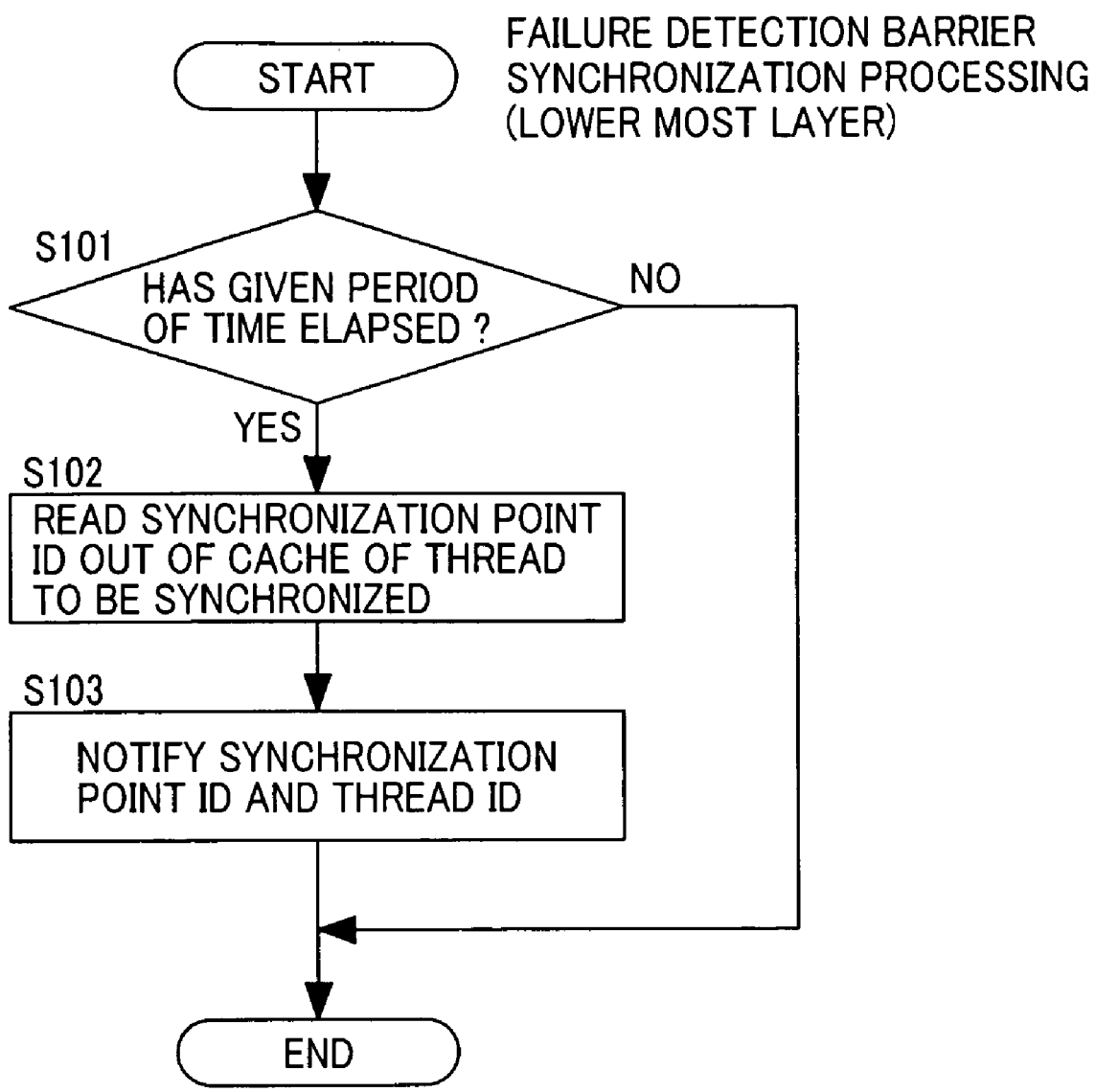
FIG. 25 is a flow chart for upper layer barrier synchronization processing that includes failure detection processing according to the fourth embodiment.

FIGS. 24 and 25 show a fourth embodiment in which a function of detecting a failure such as deadlock is added to the barrier synchronization processing described in the first embodiment. The rest of the configuration of the fourth embodiment is the same as the first embodiment.

In the process of developing a program PG for conventional parallel computation processing, deadlock can happen in which one thread that waits long for barrier synchronization makes it impossible for other threads that are operating normally to synchronize through barrier synchronization and causes them to shut down. Once deadlock occurs, there is no way to detect at which synchronization point ID a processor core in use is shut down. A conventional solution to this problem is to set a break point or the like for debugging in a source code, which lowers the productivity.

The fourth embodiment improves the efficiency of debugging by notifying a current synchronization point ID upon occurrence of a failure.

FIG. 24 is obtained by adding a step S100 for failure detection processing to the flow chart of FIG. 9, which illustrates the lowermost layer barrier synchronization processing of the first embodiment. The rest of the configuration is the same as the first embodiment.

In the step S45 of FIG. 24, as processing of checking barrier synchronization of the first layer, the parent thread keeps running the loop until the synchronization point ID of the child thread read in the step S44 matches the synchronization point ID of the parent thread, and the step S100 for failure detection processing is placed along the loop. Similarly, as processing of checking barrier synchronization of the first layer, the child thread keeps running the loop until a synchronization completion notification is received from the parent thread in the step S52, and a step S110 for failure detection processing is placed along the loop.

FIG. 25 shows a sub-routine detailing the step S100 for the failure detection processing. As the synchronization completion loop is started, elapsed time is counted in a step S101 to judge whether or not a given period of time has passed since the checking processing is started. In the case where the given period of time has passed, the program judges that a failure such as deadlock has occurred and proceeds to a step S102.

In the step S102, a synchronization point ID of a thread to be synchronized is read out of a shared area for data storage (in this example, the primary cache L1).

In a step S103, the obtained synchronization point ID and thread number are stored in the tertiary cache L3, or a given storage area of the main memory MM, as a storage area for another synchronization group or for an upper layer synchronization group.

The failure detection processing in the step S110 is as described above with reference to FIG. 25.

For instance, when deadlock happens in the thread Th0 in FIG. 4, the thread Th1 which is to be synchronized with the thread Th0 in the first layer reads, after a given period of time passes since the checking processing is started in the step S52 of FIG. 24, a synchronization point ID out of the storage area L100, which is set along a given cache line of the primary cache L1-0 shown in FIG. 5. Then the thread Th1 writes the thread number of the thread that uses the storage area L100 and the read synchronization point ID in a given storage area of the tertiary cache L3. The thread number and the read synchronization point ID may be written as other storage areas than the tertiary cache L3 as long as they are accessible to processor cores of other synchronization groups, and may be written in given storage areas such as the secondary cache L2, the main memory MM, or the like. Instead of the thread number and the synchronization point ID, the synchronization point ID alone may be written, in which case the thread (program) is debugged based on the synchronization point ID.

The data in the given storage area of the tertiary cache L3 is read through the processor cores cpu2, cpu3, . . . of other synchronization groups that are not suffering from deadlock. The read synchronization point ID and thread number can tell which thread is shut down at which synchronization point.

Thus, upon occurrence of a failure, the thread number and synchronization point ID of a thread where the failure has occurred are stored in a given storage area set in the secondary cache L2, the tertiary cache L3, or other shared area for data storage that is shared among processor cores of different groups and among processor modules. The synchronization point ID and thread number of where the failure is originated can therefore be checked by reading this shared area for data storage through another processor core that is working normally.

This enables a developer of the program PG to find, with extreme ease, a synchronization point and a thread where a failure has occurred, and to debug parallel computation processing without setting a break point as the one described above. Accordingly, the fourth embodiment significantly improves the productivity in software development.

Fifth Embodiment

Figure 26:
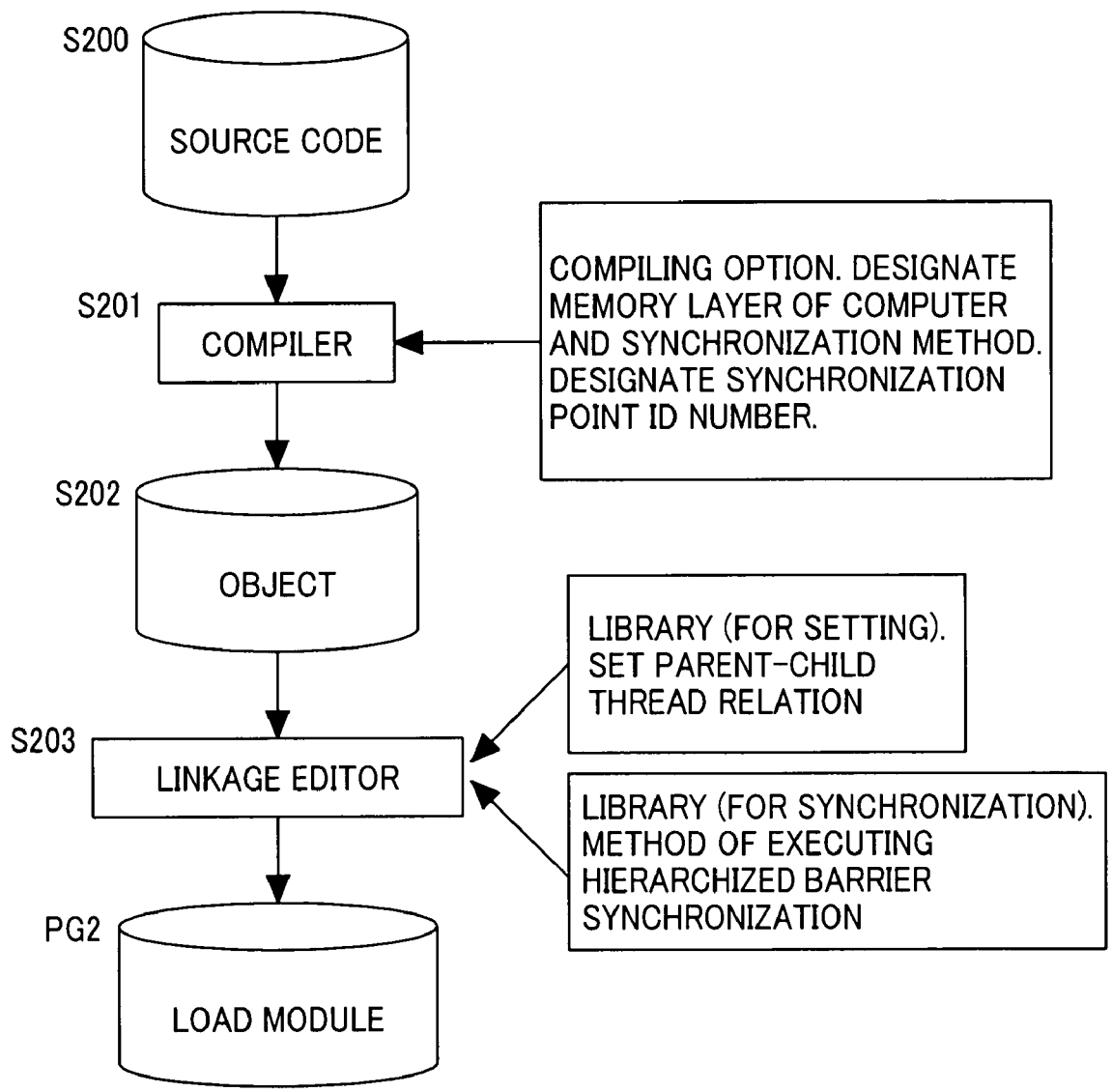
FIG. 26 is an explanatory diagram of a compiler that creates a program according to a fifth embodiment of this invention.

FIG. 26 shows, according to a fifth embodiment, a procedure of creating as a load module the computation processing PG2, which is a part of the program (load module) PG described in the first embodiment with reference to FIG. 6.

In the first embodiment, the initial setting processing PG1 requires an input of a processor core count, a synchronization group layer count, and the like. In the fifth embodiment, the count of processor cores to be used, the configuration of a multicore microprocessor, the configuration of a shared area for data storage, and the like are set in advance at the stage of creating the computation processing PG2, so that, in actual run, the load module (computation processing PG2) is simply loaded onto the main memory MM and executed.

First, in a step S200 of FIG. 26, a source code is created for parallel computation processing. In a step S201, the source code is compiled by a compiler. To execute the compiling, layers of shared area for data storages (memory layers in the drawing) of a parallel computer that runs the computation processing PG2, a synchronization point ID, the count of processor cores per processor module, and the like are entered as compile options. The compiling is performed by a computer (not shown).

The compiler sets a synchronization point at which barrier synchronization is conducted when there is a dependency relation between data pieces processed by plural processor cores. The synchronization point is given a synchronization point ID as a unique identifier. At the synchronization point, barrier synchronization layers are set in accordance with the processor core count and the count of layers of shared area for data storages. Then the compiler hierarchically sets synchronization groups in the set layers. As described in the first embodiment or the second embodiment, a synchronization group near processor cores is set as a lower synchronization group, and a higher hierarchical layer is given to a synchronization group as the distance from the processor cores increases.

As a result of the compiling, plural objects optimized for a specific parallel computer configuration are created in a step S202.

In a step S203, a linkage editor is used to couple the plural objects and create a load module (computation processing PG2) as an executable file. The linkage editor sets a parent-child relation between threads and how barrier synchronization is executed (for example, whether to use a hardware barrier synchronization mechanism).

Creating a computation processing PG2 optimum for a specific computer through the above processing and running the program on the parallel computer that is shown in FIG. 1 or FIG. 16 makes parallel computation processing possible that performs barrier synchronization without needing initial setting processing as the one described in the first embodiment.

As has been described, this invention makes multithread parallel computation processing possible that uses a multicore microprocessor. This invention is therefore applicable to a parallel computer with a multicore microprocessor, a program that performs multithread parallel computation processing using a multicore microprocessor, and a compiler that creates this program.

While the present invention has been described in detail and pictorially in the accompanying drawings, the present invention is not limited to such detail but covers various obvious modifications and equivalent arrangements, which fall within the purview of the appended claims.

What is claimed is:

1. A parallel computer synchronization method that synchronizes threads through barrier synchronization for parallel execution of plural threads in a parallel computer system including a plurality of processor modules, each having a plurality of processor cores, a main memory accessed by the processor cores and a hierarchical cache system formed between said processor cores and said main memory, said hierarchical cache system including first layer caches each being sharable among plural threads which are executed in a single processor core, second layer caches each being sharable among plural processor cores formed in a single processor module, and third layer caches each being sharable among plural processor modules, the parallel computer synchronization method comprising the steps of:

assigning plural threads to each of the processor cores to have the processor cores execute the threads;

setting at least a part of the plural threads as constituents of a synchronization group whose threads are to be synchronized; and performing barrier synchronization among the threads which are set as the constituents of the synchronization group, wherein the step of setting the threads as constituents of the synchronization group includes the steps of:

setting, on each of the first layer caches, which are sharable among a plurality of threads set as the constituents, dedicated storage areas for respectively storing synchronization information of the respective threads set as the constituents;

setting, on each of the second layer caches which are sharable among a plurality of processor cores respectively arranged to execute the threads set as the constituents, dedicated storage areas for respectively storing synchronization information of the respective threads set as the constituents, and wherein the step of performing barrier synchronization among the threads set as the constituents includes the step of:

separately synchronizing the threads in each of first layer thread groups, each group sharing one of the first layer caches, through barrier synchronization using synchronization information stored in the dedicated storage areas of the first layer caches;

separately synchronizing the threads in each of second layer thread groups, each group sharing one of the second layer caches, through barrier synchronization using synchronization information stored in the dedicated storage areas of the second layer caches; and synchronizing the threads between the second layer thread groups through barrier synchronization if a plurality of the second layer thread groups exist.

2. The parallel computer synchronization method according to claim 1, wherein the step of separately synchronizing the threads in each of the first layer thread groups includes the steps of:

writing, when one thread among the threads in each of first layer thread groups reaches a barrier synchronization point on program execution, set in advance, synchronization information of said one thread in a dedicated storage area set on a first layer cache used by a first layer thread group to which said one thread belongs;

reading synchronization information of other threads in the corresponding first layer thread group stored in the dedicated storage areas on the first layer cache; and judging, when synchronization information of said one thread matches synchronization information of the other threads, that barrier synchronization of the first layer thread group is completed.

3. The parallel computer synchronization method according to claim 1, wherein, the step of synchronizing the threads between the second layer threads groups is performed by a hardware barrier synchronization mechanism.

4. The parallel computer synchronization method according to claim 1, wherein the step of assigning plural threads to each of the processor cores to have the processor cores execute the threads includes the steps of:

setting how many processor cores out of the total processor cores are to be used;

setting how many threads are to be executed by the processor cores to be used; and assigning threads to the processor cores to be used in accordance with the set processor core count and the set thread count.

5. The parallel computer synchronization method according to claim 4, wherein the step of assigning plural threads to each of the processor cores to have the processor cores execute the threads further includes the steps of:

giving a unique identifier to each thread assigned to the processor cores to be used; and setting, based on the magnitude relation of the identifiers, one of threads in the same first layer thread group as a parent thread and the remaining threads in the thread group as child threads, and wherein, in the step of separately synchronizing the threads in each of second layer thread groups is performed by synchronizing the parent threads with each other through barrier synchronization.

6. The parallel computer synchronization method according to claim 4, wherein the step of assigning plural threads to each of the processor cores to have the processor cores execute the threads includes the step of assigning synchronization threads to the processor cores to be used, the synchronization threads being threads that carry out barrier synchronization of the other threads, and wherein, the step of separately synchronizing threads in each of second layer thread groups is performed by synchronizing the synchronization threads with each other through barrier synchronization.

7. The parallel computer synchronization method according to claim 1, wherein the step of separately synchronizing includes the steps of:

writing, when one thread among the threads in each of the first layer thread groups reaches a barrier synchronization point on program execution, set in advance, synchronization information of said one thread in a dedicated storage area set on a first layer cache used by a first layer thread group to which said one thread belongs;

reading synchronization information of other threads in the corresponding first layer thread group stored in the dedicated storage areas on the first layer cache;

judging, when synchronization information of said one thread and synchronization information of the other threads remain unmatched after a given period of time, that a failure has occurred in the other threads; and writing, in the event of failure, synchronization information of the other threads in a dedicated storage area of a different group.

8. A computer-readable storage medium embodying a program that performs barrier synchronization for parallel execution of plural threads in a parallel computer including a plurality of processor modules, each having a plurality of processor cores, a main memory accessed by the processor cores and a hierarchical cache system formed between said processor cores and said main memory, said hierarchical cache system including first layer caches, each being sharable among plural threads which are executed in a single processor core, second layer caches each being sharable among plural processor cores formed in a single processor module, and third layer caches each being sharable among plural processor modules, wherein when executed by the parallel computer, the program causes the parallel computer to perform the following steps:

assigning plural threads to each of the processor cores to have the processor cores execute the threads;

setting at least a part of the plural threads as constituents of a synchronization group whose threads are to be synchronized; and performing barrier synchronization among the threads which are set as constituents of the synchronization group, wherein the step of setting the threads as constituents of the synchronization group includes the steps of:

setting, on each of the first layer caches which are sharable among a plurality of threads set as the constituents, dedicated storage areas for respectively storing synchronization information of the respective threads set as the constituents;

setting, on each of the second layer caches which are sharable among a plurality of processor cores respectively arranged to execute the threads set as the constituents, dedicated storage areas for respectively storing synchronization information of the respective of the threads set as the constituents, and wherein the step of performing barrier synchronization among the threads set as the constituents includes the step of:

separately synchronizing the threads in each of first layer thread groups, each group sharing one of the first layer caches, through barrier synchronization using synchronization information stored in the dedicated storage areas of the first layer caches;

separately synchronizing the threads in each of second layer thread groups, each group sharing one of the second layer caches, through barrier synchronization using synchronization information stored in the dedicated storage areas of the second layer caches; and synchronizing the threads between the second layer thread groups through barrier synchronization if a plurality of the second layer thread groups are exist.

\* \* \* \* \*